United States Patent
Morozov

(10) Patent No.: US 11,178,485 B2
(45) Date of Patent: Nov. 16, 2021

(54) DUAL-RESONANCE DUAL-APERTURE SUBWOOFER SYSTEM

(71) Applicant: Teledyne Instruments, Inc., Thousand Oaks, CA (US)

(72) Inventor: Andrey K. Morozov, North Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 17/242,440

(22) Filed: Apr. 28, 2021

(65) Prior Publication Data

US 2021/0258687 A1 Aug. 19, 2021

Related U.S. Application Data

(63) Continuation of application No. 17/101,002, filed on Nov. 23, 2020, now Pat. No. 11,032,641, which is a continuation of application No. 16/985,861, filed on Aug. 5, 2020, now Pat. No. 10,911,868, which is a
(Continued)

(51) Int. Cl.
| | |
|---|---|
| *H04R 1/44* | (2006.01) |
| *H04R 1/02* | (2006.01) |
| *H04R 9/06* | (2006.01) |
| *H04R 9/02* | (2006.01) |
| *H04R 3/00* | (2006.01) |
| *H04R 29/00* | (2006.01) |

(Continued)

(52) U.S. Cl.
CPC ............ *H04R 1/44* (2013.01); *G01V 1/133* (2013.01); *G10K 11/172* (2013.01); *H04R 1/025* (2013.01); *H04R 3/00* (2013.01); *H04R 9/022* (2013.01); *H04R 9/025* (2013.01); *H04R 9/06* (2013.01); *H04R 29/001* (2013.01); *H04R 2400/11* (2013.01)

(58) Field of Classification Search
CPC . H04R 1/44; H04R 1/025; H04R 3/00; H04R 9/022; H04R 9/025; H04R 9/06; H04R 29/001; H04R 2400/11; G01V 1/133; G10K 11/172
See application file for complete search history.

(56) References Cited

U.S. PATENT DOCUMENTS

| | | |
|---|---|---|
| 3,345,607 A | 10/1967 | Nelkin et al. |
| 4,763,307 A | 8/1988 | Massa |
| 5,140,560 A | 8/1992 | Percy |

(Continued)

*Primary Examiner* — Andrew L Sniezek
(74) *Attorney, Agent, or Firm* — K&L Gates LLP

(57) ABSTRACT

A submersible sound system may include a housing, an end piece, an elastic membrane, an end cap affixed to the elastic membrane, and a subwoofer speaker system disposed within the housing and supported by a speaker support. A bubble sound source may be defined by the speaker support, the speaker diaphragm, an anterior end of the housing, the elastic membrane, and the end cap. The housing, end piece, and a posterior surface of the speaker support may form a sealed enclosure. The sound system may include a tuning pipe disposed between the sealed enclosure and the bubble sound source. A Helmholtz resonator may be disposed anteriorly of the speaker system. Multiple sound system may be assembled to form a cluster. The cluster may be defined by the vertices of regular polyhedron. The sound systems may be controlled to maintain the speaker systems within acceptable thermal limits.

12 Claims, 18 Drawing Sheets

Related U.S. Application Data continuation of application No. 16/459,875, filed on Jul. 2, 2019, now Pat. No. 10,771,892.

(51) Int. Cl.
*G10K 11/172* (2006.01)
*G01V 1/133* (2006.01)

(56) References Cited

U.S. PATENT DOCUMENTS

| | | |
|---|---|---|
| 5,184,332 A | 2/1993 | Butler |
| 8,331,198 B2 | 12/2012 | Morozov et al. |
| 8,441,892 B2 | 5/2013 | Morozov et al. |
| 8,488,816 B2 | 7/2013 | Inagaki et al. |
| 8,634,276 B2 | 1/2014 | Morozov et al. |
| 9,383,463 B1 | 7/2016 | Morozov et al. |
| 9,949,022 B2 | 4/2018 | Kropf |
| 10,139,503 B2 | 11/2018 | Morozov et al. |
| 10,401,511 B2 | 9/2019 | Morozov et al. |
| 10,656,293 B2 | 5/2020 | Griffin et al. |
| 10,771,892 B1 | 9/2020 | Morozov |
| 10,911,868 B2 | 2/2021 | Morozov |
| 10,979,801 B2 | 4/2021 | Fallon |
| 11,032,641 B2 * | 6/2021 | Morozov .............. H04R 1/025 |
| 2003/0123692 A1 | 7/2003 | Ueki |
| 2019/0318536 A1 | 10/2019 | Nemetz et al. |
| 2021/0105559 A1 | 4/2021 | Morozov |

\* cited by examiner

DUAL-RESONANCE DUAL-APERTURE SUBWOOFER SYSTEM

STATEMENT OF PRIORITY

This application is a continuation application filed under 35. U.S.C. § 120 of U.S. patent application Ser. No. 17/101,002 entitled "UNDERWATER SUBWOOFER WITH ADVANCED COOLING SYSTEM" filed on Nov. 23, 2020, which, in turn, is a continuation application filed under 35. U.S.C. § 120 of U.S. patent application Ser. No. 16/985,861 now U.S. Pat. No. 10,911,868, entitled "CLUSTERS OF UNDERWATER SEISMIC SOURCES" filed on Aug. 5, 2020, which, in turn, is a continuation application filed under 35 U.S.C. § 120, of U.S. patent application Ser. No. 16/459,875, now U.S. Pat. No. 10,771,892, entitled "UNDERWATER SUBWOOFER SYSTEM," which was filed on Jul. 2, 2019, the disclosures of which are all incorporated herein by reference in their entirety and for all purposes.

BACKGROUND

The subject matter described in the present disclosure was developed with U.S. Low frequency acoustic and seismo-acoustic projectors find applications in marine seismic survey, underwater, ocean acoustic tomography, long-range acoustic navigation and communications. All these applications need powerful and efficient sound sources in a low frequency range such as frequency range 5-100 Hz.

The low frequency source can be one of various impulse types such as explosive (e.g. dynamite), air-guns, plasma (sparker) sources and boomers, or marine vibrators (vibroseis) providing continuous frequency sweeps. Seismic air-gun surveys such as those used in the exploration of oil and gas deposits underneath the ocean floor, produce loud, sharp impulses that propagate over large areas and increase noise levels substantially. While air-guns conventionally are traditional tools to image formations, structures, and deposits deep in the ocean substrate, they also have drawbacks from an engineering/industry point of view. They produce high power non-coherent sound pulses and often radiate in directions other than those required for hydrocarbon exploration. Also, their signal is not highly controllable, either in frequencies content or stability. Marine Vibrators are a coherent type of sound source, which can be a quieter and less harmful technology. In addition, such a sound source provides clearer, more precise and higher resolution imaging of the bottom properties due to their coherent signal and streamer array processing. Reducing and managing the impact of oil exploration on marine mammals may be important to oil and gas producers. Application of quiet and highly coherent marine vibrators as a replacement for the traditional air-gun technology has been an increasing focus of oil and gas producers.

Current continuous wave type sources make use of hydraulic, pneumatic, piezoelectric or magnetostrictive drivers and different types of resonance systems to store acoustic energy and to improve impedance matching, when generating low-frequency sound waves in water. The power output of a simple acoustic source is proportional to the squares of volume, velocity, and frequency and needs a large vibrating area to achieve reasonable levels. As a result, the sound source can become unacceptably large and expensive.

Seismic sources in the form of an underwater gas-filled balloon (or bubble) have been proposed and patented, for example in U.S. Pat. Nos. 10,139,503, 9,383,463, 8,634,276, 8,441,892, 8,331,198, the entire disclosures of which are hereby incorporated by reference herein. A resonant bubble seismic source is a simple, efficient, narrow-band projector. Seismic survey applications may demand a large frequency band and underwater bubble sources may be mechanically tuned over a large frequency band. In one system, a projector changes its resonance frequency by mechanically changing a length of an air-duct between two inside resonators. This tunable bubble seismic source is functional, but turbulent losses require large dimensions for the tunable air duct and for the whole resonator. Furthermore, tunable resonance systems (e.g., high-Q tunable systems) may have many other disadvantages. For example: they may be too sensitive to towing depth and water flow fluctuations; they may have limitations on their frequency sweep rate; they may transmit only specific waveforms with a slowly changing frequency; they may need a special resonant frequency control system to keep the resonant frequency equal to the instantaneous frequency of a transmitted signal; and they may have a large start/stop transient time.

U.S. Pat. Nos. 10,139,503, 9,383,463, respectively, describe a broadband dual bubble resonant system and a bubble resonator excited by an internal motor driven pistons or by valve controlled air flow from a blower. Both systems may be relatively inefficient and expensive; they may use a very complicated nonlinear motor control, either by controlling the motor itself or valves for the blower system. However, such systems may make it difficult to achieve high quality linear sound reproduction. An additional problem may be the noise caused by motor itself. Without special silencers, shock-mounts, and sound isolation from water, the motor noise radiates directly into the water and may cause additional problems for sound receivers with high sensitivity.

Therefore, it appears that an improved underwater sound source having low frequency transmission capabilities would be desirable for marine seismic surveying.

SUMMARY

In one aspect, a sound source may include a few gas filled underwater air-resonators, at least one resonator in a form of cylindrical or spherical gas-filled bubble covered by an elastic membrane, separating gas from water, and at least one subwoofer speaker, moving between the resonators and exciting oscillations of the gas pressure. The resonators and subwoofer may be permanently tuned to different frequencies, uniformly covering the working range of the frequencies. The subwoofer may be driven by an audio amplifier, amplifying the signal from digital-analog converter of the computer. The computer is connected to sensors associated with the subwoofer, measuring current, voltage, temperature and the position of the subwoofer cone. The computer may be programmed to equalize the impedance of the subwoofer and keep the temperature and excursion of the subwoofer within safe limits.

In some aspects, the underwater subwoofers may be mounted on a frame in a polyhedral cluster, thereby achieving a very large power and high efficiency. The frame with a polyhedral structure may include suppressor fins and keels to make it stable when towed at a high speed.

In various aspects, a submersible sound system comprises: a housing; a housing end piece in mechanical communication with a posterior end of the housing; an elastic membrane in mechanical communication with an anterior end of the housing; an end cap in mechanical communication with the elastic membrane; and a subwoofer speaker system disposed within the housing. The subwoofer speaker system comprises: a magnet assembly disposed within the posterior end of the housing; a frame in mechanical communication with the magnet assembly; a voice coil; a diaphragm in mechanical communication with the frame and configured to be driven by the voice coil; a spider or damper to be used as the rear suspension element for a voice coil; a subwoofer speaker support in mechanical communication with the frame; and an interior portion of the housing. An anterior surface of the subwoofer speaker support, an anterior surface of the diaphragm, the anterior end of the housing, the elastic membrane, and the end cap together define a sealed cylindrical bubble sound source.

In other aspects, a submersible sound system comprises: housing; a housing end piece in mechanical communication with a posterior end of the housing; an elastic membrane in mechanical communication with an anterior end of the housing; an end cap in mechanical communication with the elastic membrane; a resonator end wall in mechanical communication with the anterior end of the housing; a Helmholtz resonator throat disposed within the resonator end wall; and a subwoofer speaker system disposed within the housing. The subwoofer speaker system comprises: a magnet assembly disposed within the posterior end of the housing; a frame in mechanical communication with the magnet assembly; a voice coil; a diaphragm in mechanical communication with the frame and configured to be driven by the voice coil; a subwoofer speaker support in mechanical communication with the frame and an interior portion of the housing; and a tuning pipe disposed within the subwoofer speaker support. The housing, the housing end piece, and a posterior surface of the subwoofer speaker support together form a posterior enclosure. An anterior surface of the resonator end wall, the anterior end of the housing, the elastic membrane, and the end cap together define a sealed cylindrical bubble sound source. The anterior surface of the diaphragm, an anterior surface of the subwoofer speaker support, an anterior portion of the housing, the resonator end wall, and the Helmholtz resonator throat together define a Helmholtz resonator. The Helmholtz resonator throat is configured to permit fluidic communication between the Helmholtz resonator and the cylindrical bubble sound source. The tuning pipe extends between the posterior enclosure and the Helmholtz resonator and is configured to permit fluidic communication between the posterior enclosure and the Helmholtz resonator.

In yet other aspects, an underwater sound system comprises a sound system support having a plurality of vertices and a plurality of sound sources. The plurality of vertices form the vertices of a regular polyhedron. The plurality of sound sources in the vertices are equidistant from one center of the polyhedron, which is referred to as a phase center. Each of the plurality of sound sources comprise: a housing; a housing end piece in mechanical communication with a posterior end of the housing; an elastic membrane in mechanical communication with the anterior end of the housing; an end cap in mechanical communication with the elastic membrane; and a subwoofer speaker system disposed within the housing. The subwoofer speaker system comprises a magnet assembly disposed within the posterior end of the housing; a frame in mechanical communication with the magnet assembly; a voice coil; a diaphragm in mechanical communication with the frame and configured to be driven by the voice coil; and a subwoofer speaker support in mechanical communication with the frame and an interior portion of the housing. An anterior surface of the subwoofer speaker support, an anterior surface of the diaphragm, the anterior end of the housing, the elastic membrane, and the end cap together define a sealed cylindrical bubble sound source. Each one of the plurality of sound sources is affixed to each one of the plurality of sound system support vertices.

FIGURES

Various features of the embodiments described herein are set forth with particularity in the appended claims. The various embodiments, however, both as to organization and methods of operation, together with advantages thereof, may be understood in accordance with the following description taken in conjunction with the accompanying drawings as follows.

DETAILED DESCRIPTION

Figure 1:
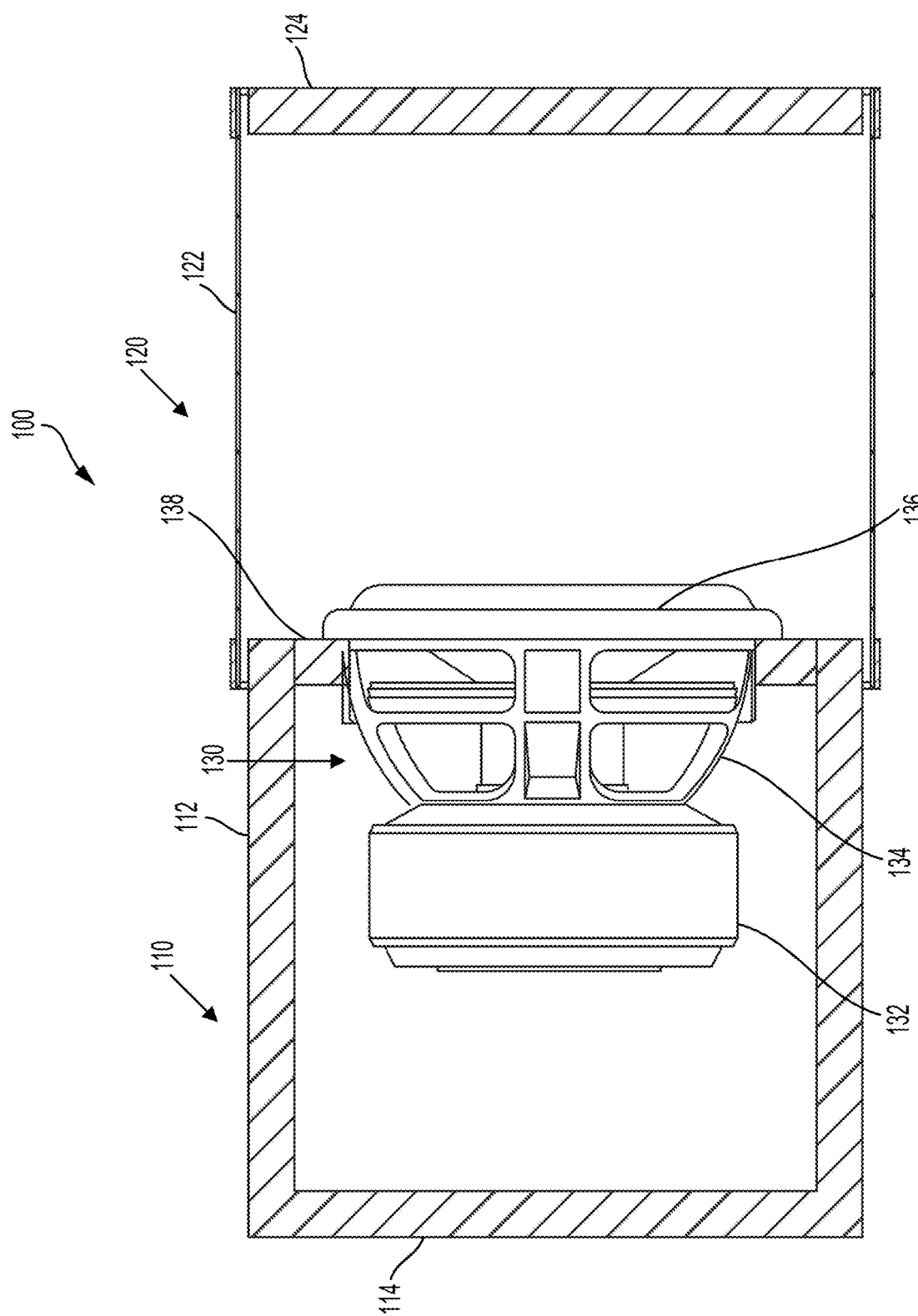
FIG. 1 is a diagram of one aspect of a submersible sound system comprising a subwoofer speaker system according to the present disclosure.

There is a growing interest for a very low frequency sound source in the frequency range below 100 Hz for such applications as Arctic under-ice acoustic, far-range navigation, communications and thermometry, sub-bottom seismic survey, et cetera. The ultra-low frequency sound propagates without attenuation and loss of coherency at a very far distance covering the water column from the surface to the ocean floor. Another benefit, which has been in an increasing focus of major oil and gas producers, is reducing the impact of noise from traditional air-guns on marine mammals.

A coherent sound source can advantageously be quieter and more benign to marine mammals. Marine Vibrators are a coherent type of seismic source, which are less harmful for marine inhabitants. They also provide a clearer, more precise and higher resolution imaging of the bottom formations, structures, and deposits. To build a sound source with a frequency below 100 Hz is a hard task due to a very large emitted volume velocity or product of aperture area relative to its linear displacement. For sound pressure levels (SPLs) larger than 200 dB re 1 µPa at 1 meter, the volume displacement at 5 Hz cycle can be tens of liters. Accordingly, systems with rigid or flexural vibrating diaphragm with a large aperture area are difficult to build. Also, they are usually not efficient or have a very narrow bandwidth. Highly efficient frequency sweeping sound sources on the base of tunable organ pipes show very good performance for 150-2000 Hz frequency bandwidth.

However, a further decrease of the low frequency will be hard to achieve because of the organ pipe growing dimension. The present disclosure may address such giant design demands relative to underwater sound emitting by providing a coherent seismic marine sound source based on the application of an underwater, gas filled bubble resonator. The present disclosure provides a promising high power, highly efficient, and coherent seismic source at low frequencies.

A gas-filled bubble offers a large radiating area and functions as a good impedance transformer with very high radiation efficiency. The elastic membrane supports high volume displacement with a large radiation aperture and prevents cavitation damage. Large volume displacement and velocity support the large radiation power. The sound sources have very small coupling effects in water and can work together in a large phased array. An infra-sound transducer with a resonator in the form of an underwater bubble or balloon made from an elastic material generates seismic waves in a different manner. However, the physics of the dynamics is similar to the physics of air released from an air-gun.

The equation of the dynamics of spherical bubbles was first derived and used by Rayleigh (1917) and then Plesset (1949). The most general form of the equation of the dynamics with additional terms due to surface tension and viscous effects in the bubble surface condition is widely known as the Rayleigh-Plesset equation. The practical bubble has a shape that is different from spherical. Its internal pressure oscillations are comparable with the difference of static gravity forces and acoustic-gravity oscillations and are part of its dynamics. The real Q-factor of a practical bubble may be smaller than a theoretical Q-factor. The best transducer to excite the propagating spherical wave is a sphere. It may be desirable to have the shape of the seismic source as close as possible to the sphere. However, practically it may be difficult to keep the spherical shape of the oscillating resonator in water, especially if it is towed. The buoyant force will pool at the top of the large spherical bubble and deform it. In response, a reasonable engineering compromise can be a short horizontal cylinder. Such a cylinder has cylindrical symmetry, can be towed, and can better retain its shape in the water. The bubble source, consisting of cylindrical sections, has been described in the U.S. Pat. Nos. 10,139,503, 9,383,463, 8,634,276, and 8,441,892, the disclosures of which are incorporated by reference herein in their entirety and for all purposes. A simplified linear acoustic model of the bubble is based on a wave propagation condition and an adiabatic equation for an underwater bubble state.

The following Equations 1 through 6 are derived from Newton, Hooke, adiabatic (Boyle-Mariotte) and Euler laws. The pressure p in a spherical wave with the wave number $k=\omega/c$ at the distance r from the source is known from a spherical symmetry and wave propagation exponent:

$$p = \frac{\exp(-ikr)}{r}, \qquad \text{Equation 1}$$

where c is the sound, velocity f is the frequency; $k=\omega/c$, $\omega=2\pi f$ in which $\omega$ is the angular frequency of the wave.

The Euler's equation gives the velocity of water particles u:

$$u = -\frac{1}{i\rho\omega}\frac{\partial p}{\partial r} = \frac{(ikr+1)}{i\omega\rho r}p, \qquad \text{Equation 2}$$

where $\rho_w$ is the water density. The combination of the above equations gives the impedance $Z_b$ of the bubble:

$$Z_b = \frac{p}{1} = \frac{i\omega\rho_w r_b / A_b}{1 + ikr_b} = \frac{1}{\frac{1}{i\omega L_b} + \frac{1}{R_b}}, \qquad \text{Equation 3}$$

where $I=uA_b$ is the volume velocity; $A_b$ is the aperture area; $r_b$ is the radius of the cylinder; $c_w$ is the sound velocity in water; and $$L_b = \frac{\rho_w r_b}{A_b};$$

$$R_b = \frac{\rho_w c_w}{A_b}$$

are equivalent parameters of the electrical model.

The Hooke law explains the stretching of the cylindrical membrane:

$$p = I \bigg/ \left(i\omega \frac{A_b r_b^2}{E_m h_m}\right) = I/(i\omega C_m) \qquad \text{Equation 4}$$

where $E_m$ is the Young modulus of the membrane material; $h_m$ is the thickness of the membrane;

$$C_m = \frac{A_b r_b^2}{E_m h_m}$$

is the equivalent capacitor of the electrical model.

The adiabatic oscillations of bubble gas have the pressure oscillations dp:

$$dp = \frac{dvP_b}{V_b\gamma} = \frac{I}{i\omega\gamma V_b/P_b} = \frac{I}{i\omega C_b} \quad \text{Equation 5}$$

Where $\gamma=1.4$ is the adiabatic constant and $V_b$, $P_b$, are the equilibrium volume and pressure of the bubble; $C_b=V_b\gamma/P_b$, is the equivalent capacitor of the electrical model.

Finally the air duct with the length $l_h$, and area of the pipe $A_h$, has the equation for its flow $I=uA_h$, and pressure p:

$$p = i\omega\frac{\rho_a l_h}{A_h} I = i\omega L_h I \quad \text{Equation 6}$$

where $\rho_a$ is the air density;

$$L_h = \frac{\rho_a l_h}{A_h}$$

and I is the inductance of the electrical model.

In a majority of cylindrical bubble systems, the sound source typically includes a motor and a piston; or a powerful blower and valves controlled by the motor. Both of these approaches are limited in the frequency range attainable. It is difficult to drive a piston with mass M by a rotary motor with a crank shaft mechanism or linear motor. The force F on the piston can be calculated as F=M*a, where acceleration, $a=d*(2*\pi*f)^2$. For 100 Hz, the acceleration will be a=d*394784. For a given displacement of 1 cm and piston mass 1 kg, the force will be 4000 N. This very large force is not easy to achieve by simple mechanical engineering solutions. However, a typical subwoofer system can readily work at a frequency of 100 Hz. A standard commercial off-the-shelf (COTS) subwoofer may be fabricated of strong and light composite materials, have neodymium magnets having large magnetic strength, and may also include a cooling system. The use of a subwoofer speaker system can readily operate at 100 Hz. A typical audio speaker may have a dynamic range between 20 Hz-20 kHz in air, and a typical woofer speaker may operate in a range between 20 Hz-2000 Hz range. However, the subwoofer—using a matching impedance acoustical system including cylindrical underwater air-bubble resonator as described herein—may produce a very loud sound underwater in a very low frequency range between 10 Hz-200 Hz. The matching impedance acoustical system may refer to matching speaker impedance of the subwoofer speaker system with the radiation impedance of the water surrounding the subwoofer system.

In some aspects, a subwoofer speaker system may have a diameter between 12"-15" and operate at root mean square (RMS) electric power up to 10 kW for a frequency band between 10 to 200 Hz. A subwoofer may differ from a typical audio speaker in that the subwoofer may have a very large speaker excursion of up to 2", very strong motor force BI=20-30 Tesla-meter, and may have a very low resonance frequency at about resonance 25 Hz-40 Hz. The traditional subwoofer may use a ferrite-strontium magnet, while the more advanced subwoofers may use neodymium rare earth magnets with very high magnetic field. Additionally, the subwoofer frame can handle very high temperatures. The subwoofer cones may be built from aluminum or composite (carbon-fiber, Kevlar™) multilayer structures, which are light and very strong. The subwoofers can operate at very high power up to 10 kW and more at high efficiency.

For limited power applications (e.g., limited by 185 dB SPL re 1 μPa at 1 m) the standard sub-woofer can be much easier, more practical and lower cost for an acoustical exciter. In some aspects, a subwoofer may be available at the 1000-3000 kW RMS electric power range. Such actuators are highly linear, easy to drive by a standard audio amplifier, and easy to install and to replace if needed. In addition, a subwoofer system controller can use information about voltage, current, excursion and heat to match impedance and keep the subwoofer in a safe condition. In aspects in which very high power (up to 230 dB SPL re 1 μPa at 1 m) is desired, multiple underwater subwoofers may be mounted on a frame in a polyhedron cluster. In some aspects, the vertices or corners of the polyhedron are equidistant from one phase center and operate as one very efficient spherical wave underwater sound source. The frame with such a polyhedron structure may include suppressor fins and keels to make it stable when towed at a high speed. Such clusters can be combined into array structures and create needed directivity patterns.

It may thus be recognized that the use of one or more subwoofer systems in an underwater sound source may provide a simplified acoustical actuator and control system, improve linearity and frequency response of the sound system, improve the reliability of the sound system, and simplify maintenance issues, while operating at a frequency range not readily achievable by other mechanical-based underwater sound systems.

The sub-woofer also can be represented by a simple model as illustrated by Equation 7:

$$p = I_c = \frac{Bl}{A_s} = i\omega\left(\frac{M_S}{A_S^2}\right)I + \frac{I}{i\omega(A_S^2 C_{ms})} = i\omega L_S I + \frac{I}{i\omega C_S} \quad \text{Equation 7}$$

where $C_{ms}$ is the mechanical compliance; $M_s$ is the moving parts mass; BI is the motor strength; $A_s$ is the effective radiating area;

$$L_S = \frac{M_S}{A_S^2}$$

is the equivalent inductance and $C_s=A_s^2 C_{ms}$ is the equivalent inductance. Equation 8 is for the electrical part of the subwoofer and includes back electromotive force (EMF) pAsBI, the inductance of the coil $L_c$ and resistance of the coil $R_c$:

$$U-BlI/A\_s=I_c(i\omega L_c+R_c) \quad \text{Equation 8:}$$

where U is the voltage of the input signal; $I_c$ is the current through the coil.

In the following aspects of submersible sound systems, the equivalent resonance structures are composed of combinations of the equivalent electrical elements as disclosed above. Among the various aspects disclosed below, the transition from air to underwater sound propagation is the principal difference from the traditional audio engineering systems for air propagated sound. The simplest system with the smallest number of poles is a 4 pole system.

Basic Submersible Sound System with Subwoofer

FIG. 1 depicts a first aspect of a submersible sound system 100. The basic submersible sound system 100 includes a sealed chamber 110 at a posterior end and a cylindrical bubble source 120 at an anterior end. The sealed chamber 110 is composed of a cylindrical housing 112 to which a housing end piece 114 is affixed at a posterior end of the cylindrical housing 112. The cylindrical bubble source 120 is configured to be filled with gas. The cylindrical bubble source 120 is composed of a cylindrical elastic polyurethane membrane 122 that is affixed at an anterior end of the cylindrical housing 112. The cylindrical bubble source 120 also includes an end cap 124 that is sealed at the anterior end of the elastic membrane 122. The elastic membrane 122 may separate a subwoofer driver (not illustrated) from the buoyancy forces of the surrounding water and enable a speaker diaphragm 136 to be loaded uniformly. In some aspects, the end cap 124 may be a solid piece. In some aspects, the end cap 124 may also include a deformable membrane.

Disposed within the submersible sound system 100 is a subwoofer speaker system 130. In some aspects the subwoofer speaker system 130 is disposed within the posterior end of the housing 112. The subwoofer speaker system 130 is composed of a magnet assembly 132, a frame 134, a voice coil (not illustrated), and the speaker diaphragm 136. The frame 134 is configured to support the magnet assembly 132 and the speaker diaphragm 136. The magnet assembly 132 is disposed within the sealed chamber 110 at the posterior end of the submersible sound system 100. The subwoofer speaker system 130 is supported in the housing 110 by means of a subwoofer speaker support 138. The sealed chamber 110 is maintained in a sealed configuration by means of the cylindrical housing 112, the housing end piece 114, a posterior end of the subwoofer speaker support 138, and a posterior surface of the diaphragm 136.

The speaker diaphragm 136 is driven by the voice coil in response to receiving an AC electrical signal. The AC electrical signal may be sourced by a control circuit that may control an amplitude and a frequency of the AC electrical signal. The magnetic field developed within the voice coil due to the AC electrical signal may cause the voice coil and the diaphragm 136, to which it is attached, to move relative to a static magnetic field produced by the magnet assembly 132. When the diaphragm 136 is actuated by the voice coil, its motion perturbs the gas disposed within the bubble source 120. In this way, the subwoofer speaker system 130 radiates sound through the gas-filled bubble source 120 that includes the cylindrical elastic membrane 122. It may be understood that the bubble source 120 may also be maintained in a sealed configuration defined by the end cap 124, the cylindrical elastic membrane 122, an anterior surface of the subwoofer speaker support 138, and an anterior surface of the diaphragm 136.

It is recognized that a sealed enclosure can have a relatively smooth roll-off and flat response in an acoustical system. Equations 9 through 12 relate to the response of the sound system 100 depicted in FIG. 1 and include:

$$U - Bl\frac{I}{A_S} = I_C(i\omega L_C + R_C) \qquad \text{Equation 9}$$

$$I_C \frac{Bl}{A_S} = i\omega L_S I + \frac{I}{i\omega C_S} + \frac{I}{i\omega C_0} + IZ_b; \qquad \text{Equation 10}$$

$$p_b = IZ_b; \quad p_r = \frac{P_b}{\left(\frac{1}{i\omega L_b} + \frac{1}{R_b}\right)\frac{1}{i\omega C_m} + 1}$$

$$Z_b = \frac{1}{i\omega C_b + \frac{1}{\frac{1}{i\omega C_m} + \frac{1}{\frac{1}{i\omega L_b} + \frac{1}{R_b}}}} \qquad \text{Equation 11}$$

where $V_0$ is the volume of the resonator behind the subwoofer $$C_0 = P_b \gamma / V_0; \; C_b = P_b \gamma / V_b; \; L_S = \frac{M_S}{A_S^2}; \qquad \text{Equation 12}$$

$$C_s = A_S^2 C_{ms}; \; R_b = \frac{\rho_w C_w}{A_b}; \; C_m = \frac{A_b r^2}{E_m h_m}$$

Figure 2:
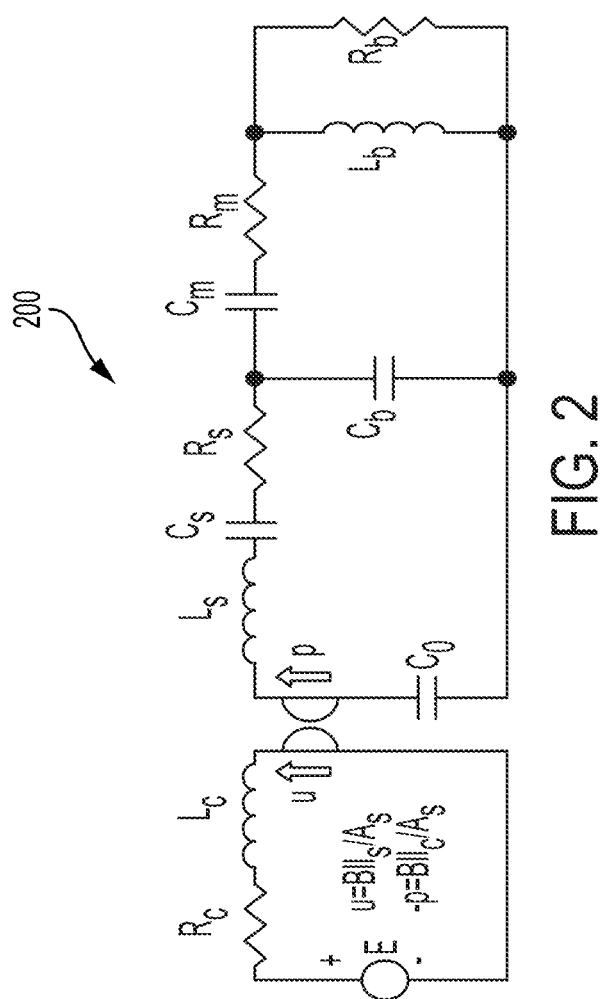
FIG. 2 depicts an equivalent electrical circuit for the submersible sound system of FIG. 1 according to the present disclosure.

FIG. 2 depicts an equivalent electrical circuit 200 for the response of the submersible sound system depicted in FIG. 1. Additional parameters presented in the equivalent electrical circuit 200 include $R_s = \omega_r L_s / Q_s$; $R_m = 4\mu/(rA_b)$, where $\mu$ is the joint viscosity of water, $Q_s$ is the mechanical Q-factor of the loudspeaker, and $\omega_r = 2\pi f$ is the mechanical resonance frequency of the loudspeaker. The electrical circuit is connected to the acoustical equivalent circuit through a gyrator and in which the back EMF is defined by $u = BlI_s/A_s$; $p = BlI_c$ where $I_s$ is the volume velocity through the speaker, p is the pressure on the speaker, $I_c$ is the current through the speaker coil, and $A_s$ is the speaker cone area.

Figure 3:
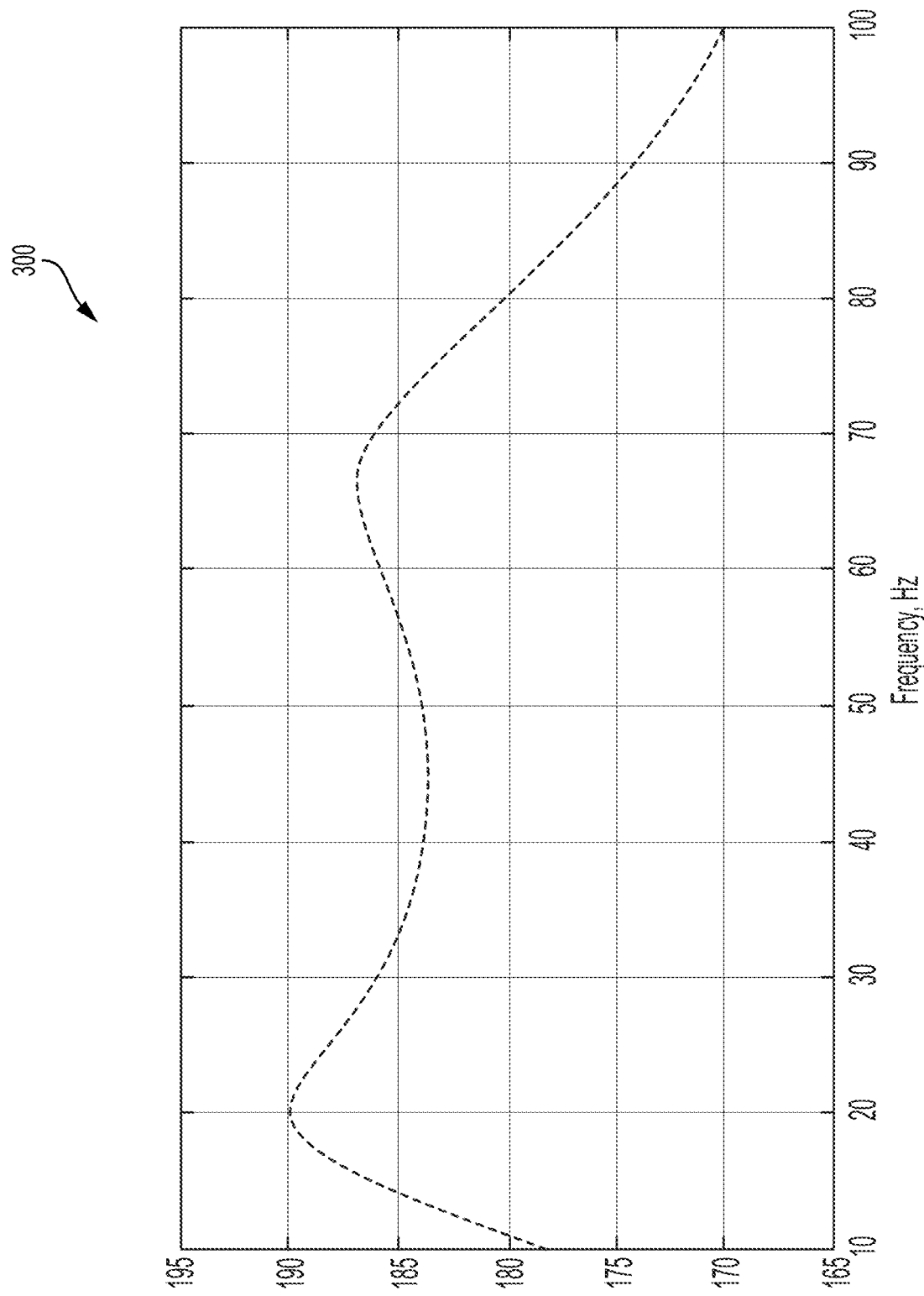
FIG. 3 is a frequency versus sound pressure plot for the response of the submersible sound system of FIG. 1 according to the present disclosure.

FIG. 3 depicts a simulation 300 of the frequency response of the submersible sound system depicted in FIG. 1 according to the equations disclosed above. Table 1 presents the parameters describing the subwoofer speaker system. Table 2 presents the parameters describing the enclosure and the bubble. As can be observed in FIG. 3, the sound system supports good sound pressure at about 184 dB. The frequency response is smooth with a little dip in the center. The efficiency of the system is about 1%.

TABLE 1

| Subwoofer | |
| --- | --- |
| Diameter of the subwoofer | 12" |
| Fs (air free resonance, Hz) | 37.6 |
| Qms (Q, mechanical) | 3.705 |
| Re (DC resistor, ohms) | 1 |
| Le (inductance, mH) | 9.35 |
| Xmax (one way linear excursion, mm) | 47 |
| RMS power, Watts | 3000 |
| Nominal power, Watts | 6000 |
| Mms (total moving mass, kg) | 0.501511 |
| Cms (mechanical compliance, mm/N) | 0.036 |
| Bl (motor strength, Tesla M) | 16.19 |
| Sd (effective radiating area, sq. m)) | 0.045239 |

TABLE 2

| Enclosure | |
| --- | --- |
| Diameter of the cylindrical hull, inch | 14 |
| Length of the motor box, inch | 14 |
| Volume of the box, L | 35 |
| Length of the bubble membrane, inch | 10 |
| Volume of the bubble, L | 25 |
| Area of the membrane, sq. m | 0.28 |
| Hardness of the membrane, | 70 A |
| Thickness of the membrane, mm | 3.17 |
| Water depth, m | 6 |

Submersible Sound System with Vented Subwoofer

Figure 4:
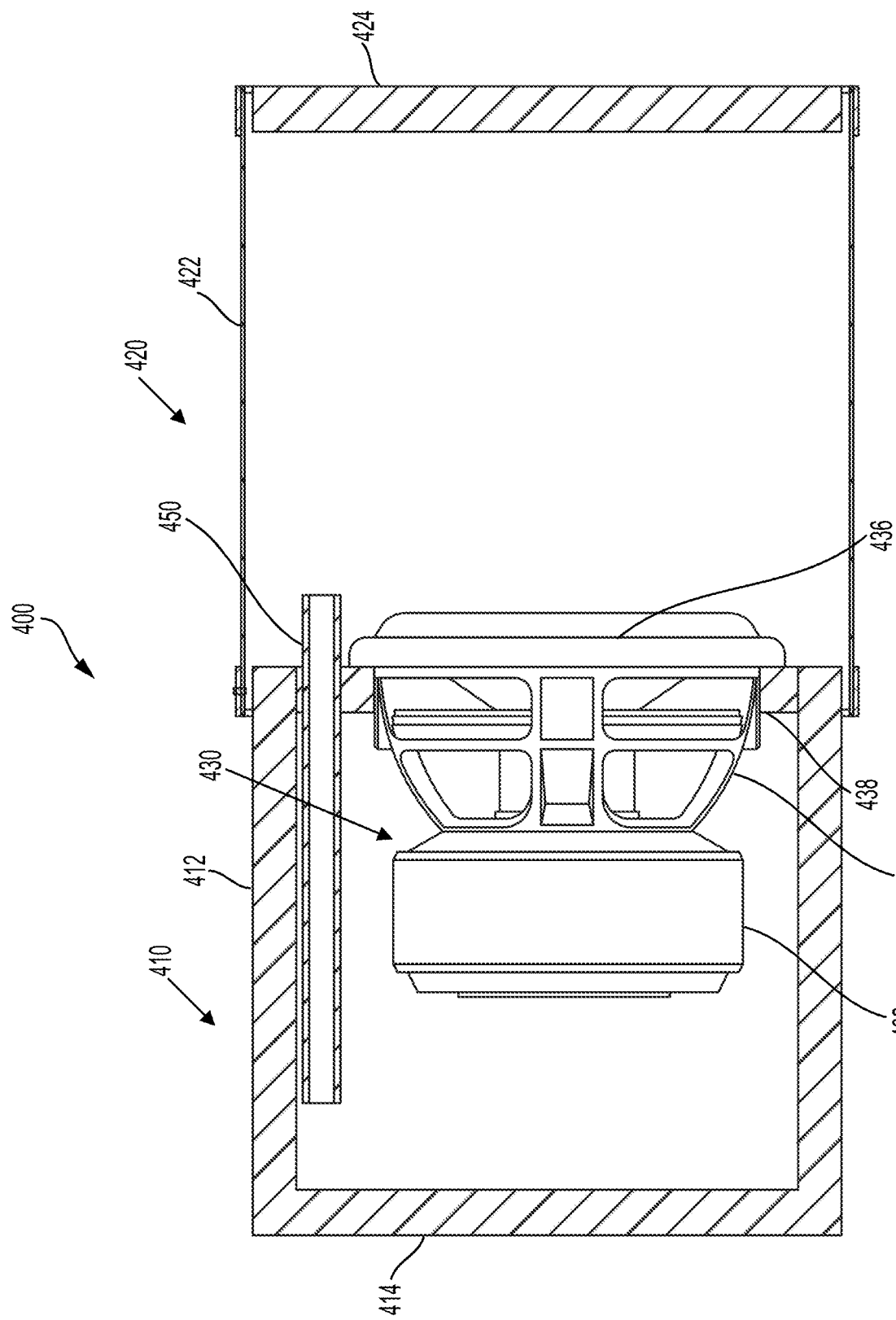
FIG. 4 is a diagram of one aspect of a submersible sound system comprising a subwoofer speaker system and a tuning pipe according to the present disclosure.

FIG. 4 depicts a second aspect of a submersible sound system having a vented subwoofer driver that includes a tuning pipe. The tuning pipe submersible sound system 400 includes a chamber 410 at a posterior end and a cylindrical bubble source 420 at an anterior end. The chamber 410 is composed of a cylindrical housing 412 to which a housing end piece 414 is affixed at a posterior end of the cylindrical housing 412. The cylindrical bubble source 420 is configured to be filled with gas. The cylindrical bubble source 420 is composed of a cylindrical elastic polyurethane membrane 422 that is affixed at an anterior end of the cylindrical housing 412. The cylindrical bubble source 420 also includes an end cap 424 that is sealed at the anterior end of the elastic membrane 422. The elastic membrane 422 may separate the subwoofer driver from the buoyancy forces of the surrounding water and enable a speaker diaphragm 436 to be loaded uniformly. In some aspects, the end cap 424 may be a solid piece. In some aspects, the end cap 424 may also include a deformable membrane.

Disposed within the vented submersible sound system 400 is a subwoofer speaker system 430. In some aspects, the subwoofer speaker system 460 is disposed at a posterior end of the cylindrical housing 412. The subwoofer speaker system 430 is composed of a magnet assembly 432, a frame 434, a voice coil (not illustrated), and the speaker diaphragm 436. The frame 434 is configured to support the magnet assembly 432 and the speaker diaphragm 436. The magnet assembly 432 is disposed within the chamber 410 at the posterior end of the vented submersible sound system 400. The subwoofer speaker system 430 is supported in the housing 410 by means of a subwoofer speaker support 438.

The speaker diaphragm 436 is driven by the voice coil in response to receiving an AC electrical signal. The AC electrical signal may be sourced by a control circuit that may control an amplitude and a frequency of the AC electrical signal. The magnetic field developed within the voice coil due to the AC electrical signal may cause the voice coil and the diaphragm 436, to which it is attached, to move relative to a static magnetic field produced by the magnet assembly 432. When the diaphragm 436 is actuated by the voice coil, its motion perturbs the gas disposed within the bubble source 420. Thus, the vented submersible sound system 400 radiates sound into the surrounding water through this perturbed gas and elastic membrane 422. It may be understood that the bubble source 420 may be maintained in a sealed configuration defined by the end cap 424, the cylindrical elastic membrane 422, an anterior surface of the subwoofer speaker support 438, and an anterior surface of the diaphragm 436.

The vented submersible sound source may also include a tuning pipe 450 to vent the chamber 410 to the bubble source 420. In some aspects, the tuning pipe 450 is disposed within the subwoofer speaker support and extends between the chamber 410 and the cylindrical bubble sound source 420. The tuning pipe 450 may be configured to permit fluidic communication between the chamber 410 and the cylindrical bubble sound source 420. In some aspects, the chamber 410 and the tuning pipe 450 together comprise a Helmholtz resonator.

In operation, when the diaphragm 436 moves, its cone vibrates in both directions, forwards toward the bubble source 420, and backwards to the chamber 410 which is vented to the bubble source 420 by the tuning pipe 450. The diaphragm 436 thus acts as a piston oscillating between two chambers. The tuning pipe 450 and chamber 410 together form a Helmholtz resonator having a resonance frequency below that of the bubble source 420. The volume of chamber 410 acts like compliance and the air in the tuning pipe 450 acts as inertia. The resonance frequency of this resonator is shown by Equation 13:

$$f_r = \frac{1}{2\pi\sqrt{LC}} = \frac{1}{2\pi}\sqrt{\frac{AP\gamma}{\rho_a l V}}, \text{ where } L = \frac{\rho_a l}{A}; C = \frac{V}{P\gamma},$$ Equation 13 where $L=\rho_a l/A$ is inertia of the air with the density $\rho_a$ in a pipe with the length l and cross section area A; $C=V/P\gamma$ is the compliance of air in the volume V and pressure P behind the subwoofer. This formula shows how resonance frequency related to pipe length and cross section area.

When cone of the diaphragm 436 moves inside the chamber 410 it shrinks the air volume and increases the pressure within the chamber 410. This pressure moves air through the tuning pipe 450. When air moves out the chamber 410, the internal pressure drops and air start moving back in. The air in the chamber 410 thus oscillates like a mass (air inside pipe) with a spring (the air inside of the tuning pipe 450). When the frequency of the diaphragm 436 oscillates at the same frequency as the frequency of the chamber resonance, the velocity of air in the tuning pipe 450 reaches a maximum. At frequencies above the resonance frequency of the chamber 410, the air flow from tuning pipe 450 to the bubble source 420 will be in phase with the diaphragm motion. As such, the resonance of the underwater bubble source 420 is designed so that the speaker impedance matches the radiation impedance of the surrounding water.

Figure 5:
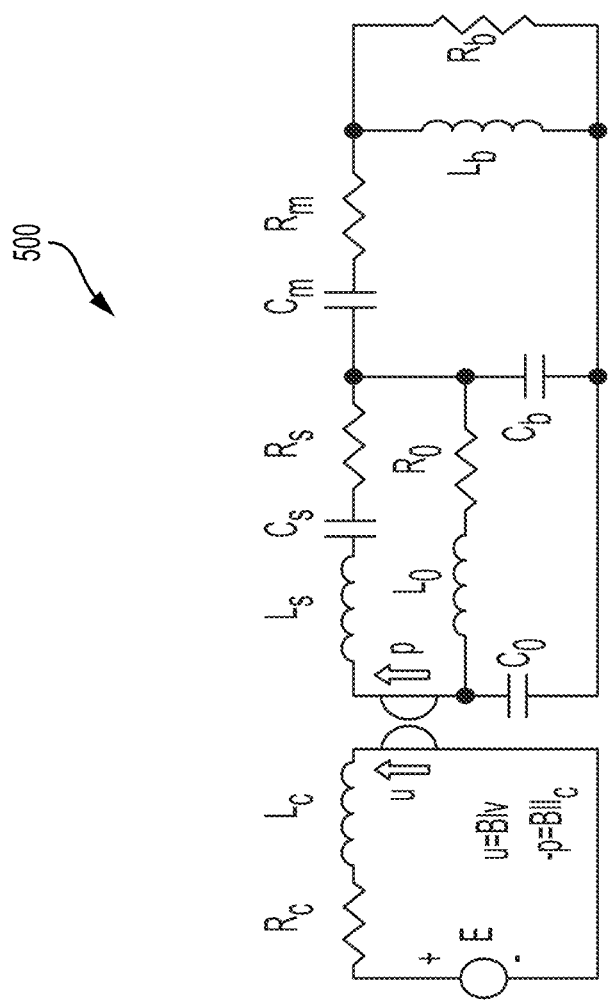
FIG. 5 depicts an equivalent electrical circuit for the submersible sound system of FIG. 4 according to the present disclosure.

FIG. 5 presents an equivalent electrical circuit 500 for the frequency response of the vented subwoofer system 400. The chamber 410 forms a very low frequency Helmholtz resonator with the equivalent capacitor $C_0=P_b\gamma/V_0$ and inductor $$L_0 = \frac{\rho_a l_0}{A_0},$$

where $A_0$, $l_0$ are the cross-area and length of the port.

$$R_0 = \frac{\omega_r L_0}{Q_0},$$

$Q_s$ is the Q-Factor of the Helmholtz port; $\omega_r=2\pi f_r$ is the resonance frequency of the Helmholtz port. The full set of equations is not very different to that presented for the aspect of the sound system depicted in FIG. 1 and as disclosed above.

TABLE 3

| Enclosure | |
| --- | --- |
| Diameter of the cylindrical hull, inch | 14 |
| Length of the motor box, inch | 14 |
| Volume of the box, L | 35 |
| Length of the bubble membrane, inch | 10 |
| Volume of the bubble, L | 25 |
| Area of the membrane, sq. m | 0.28 |
| Hardness of the membrane, | 70 A |
| Thickness of the membrane, mm | 3.17 |
| Length of the box port pipe, inch | 14 |
| Diameter of port, inch | 1 |
| Water depth, m | 6 |

Table 3 presents parameters of the vented enclosure (comprising chamber 410 and tuning pipe 450) used in a frequency response simulation of the vented submersible sound system depicted in FIG. 4. The parameters of Table 3 are the same as in the submersible sound system depicted in FIG. 1 with the addition of parameters related to the tuning pipe 450.

Figure 6:
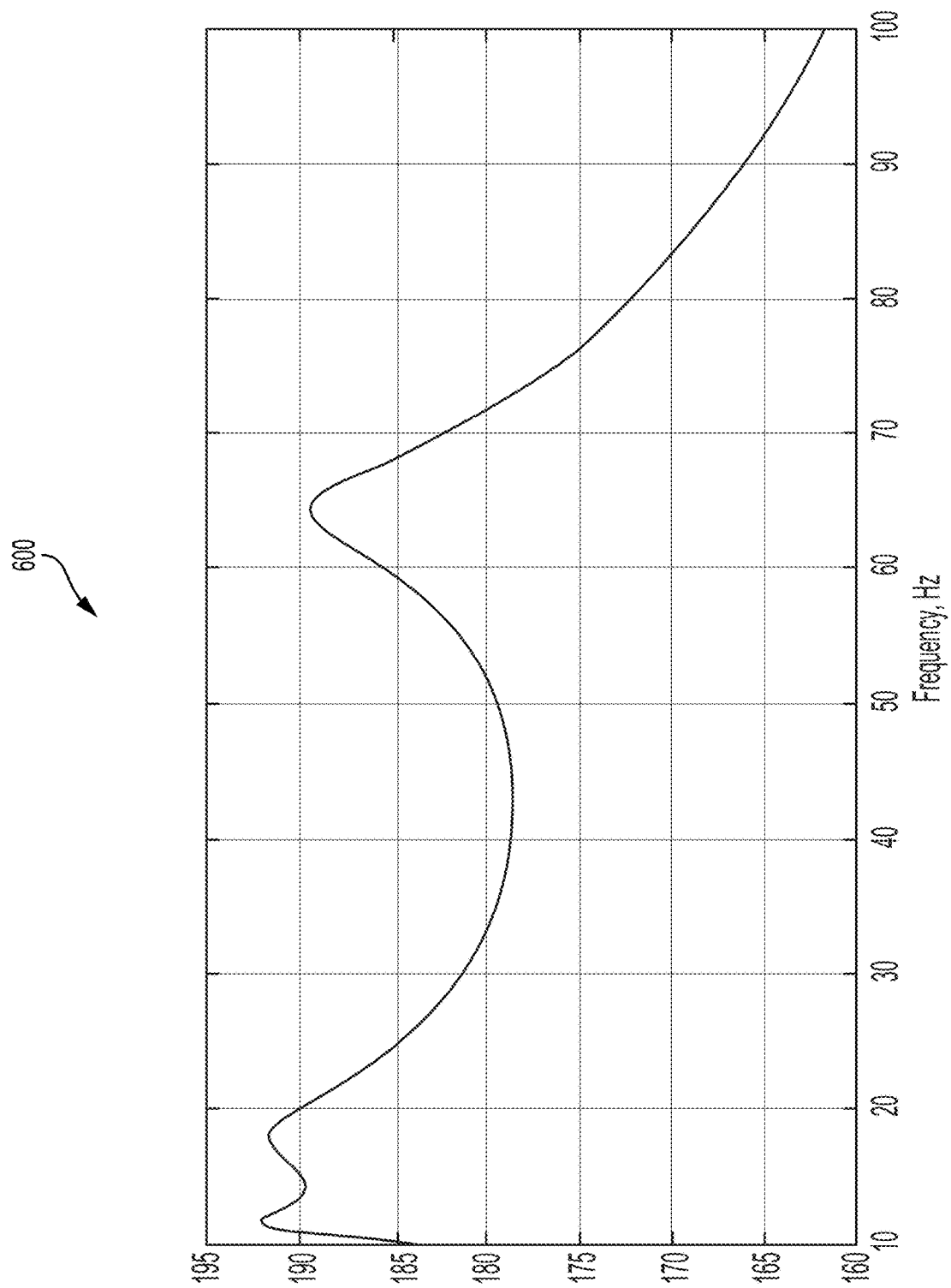
FIG. 6 is a frequency versus sound pressure plot for the response of the submersible sound system of FIG. 4 according to the present disclosure.

FIG. 6 depicts the frequency response curve 600 for the simulation of the output of the vented submersible sound system 400. The parameters related to the enclosure are those listed in Table 3, while the parameters of the subwoofer are the same as in Table 1.

It may be observed that the addition of the tuning pipe 450 to the chamber 410 may result in a lowering of the lower-end boundary of the frequency response curve 600 to about 12 Hz, 10 Hz, or even to about 5 Hz. However, the SPL of the sound signal may decrease at the center of the frequency band which may be due to the added dimension of the tuning pipe 450. Sealed ports easily permit pressure compensation when the submersible sound system is actively submerging to lower depths in the water The submersible vented subwoofer sound system may effectively act as a sealed enclosure for a tuning pipe 450 having a very small diameter.

Water-Cooled Dual Subwoofer System

Figure 7:
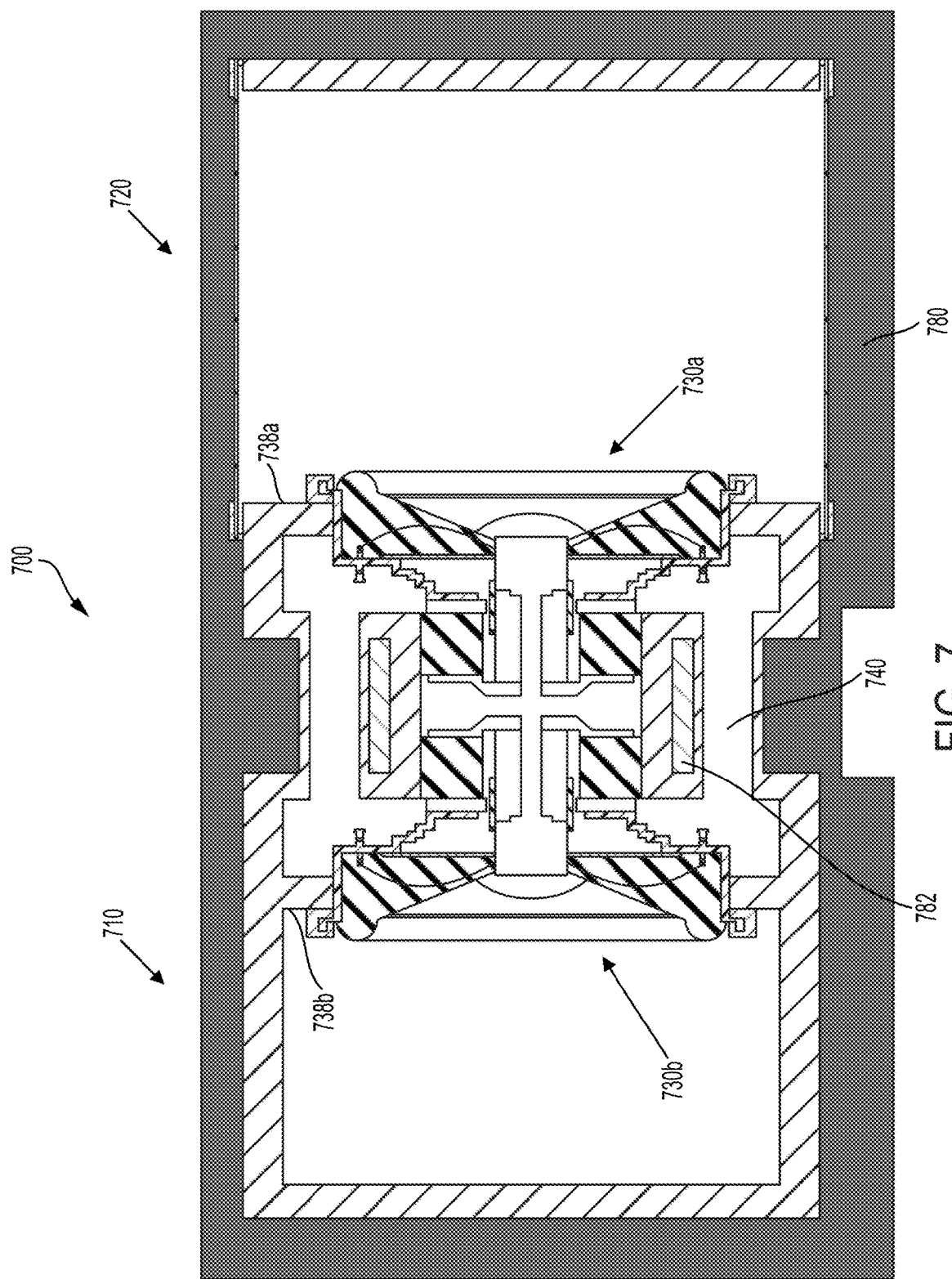
FIG. 7 is a diagram of one aspect of a submersible sound system comprising a dual opposing subwoofer speaker system according to the present disclosure.

FIG. 7 depicts yet another aspect of a submersible subwoofer sound system. Depicted in FIG. 7 is a water-cooled dual subwoofer sound system 700. The dual subwoofer system 700 includes many of the features of the basic subwoofer system 100 as depicted in FIG. 1 and disclosed above. Thus, the submersible sound system 100 includes a sealed chamber 710 at a posterior end and a cylindrical bubble source 720 at an anterior end. The sealed chamber 710 is composed of a cylindrical housing to which a housing end piece is affixed at a posterior end of the cylindrical housing. The cylindrical bubble source 720 is configured to be filled with gas. The cylindrical bubble source 720 is composed of a cylindrical elastic polyurethane membrane that is affixed at an anterior end of the cylindrical housing. The cylindrical bubble source 720 also includes an end cap that is sealed at the anterior end of the elastic membrane. The elastic membrane may separate the subwoofer driver from the buoyancy forces of the surrounding water and enable a speaker diaphragm to be loaded uniformly. In some aspects, the end cap may be a solid piece. In some aspects, the end cap may also include a deformable membrane.

A distinction between the basic submersible sound system 100 and the dual subwoofer submersible sound system 700 is that the dual subwoofer submersible sound system 700 includes a pair of subwoofer speaker systems 730a,b. Each of the pair of subwoofer speaker systems 730a,b may be disposed within a posterior end of the cylindrical housing. Each of the pair of the subwoofer speaker systems 730a,b includes a magnet assembly, a frame, a voice coil, and the speaker diaphragm. Each frame is configured to support the magnet assembly and the speaker diaphragm of the respective subwoofer speaker system 730a,b. As may be determined in FIG. 7, a first subwoofer speaker system 730a has a magnet assembly disposed within the sealed chamber 710 while the diaphragm, facing the anterior portion of the sound system 700, is acoustically coupled to the cylindrical bubble source 720. The second subwoofer speaker system 730b has a magnet assembly also disposed within the sealed chamber 710 while the diaphragm, facing the posterior portion of the sound system 700, is acoustically coupled to the sealed chamber 710. Each of the subwoofer speaker systems 730a,b is supported in the housing 710 by means of a respective subwoofer speaker support 738a,b.

The speaker diaphragm of each of the two subwoofer speaker systems 730a,b is driven by the voice coil in response to receiving an AC electrical signal. The AC electrical signal may be sourced by a control circuit that may control an amplitude and a frequency of the AC electrical signal. In some aspects, the diaphragm of the first subwoofer speaker system 730a may be driven in an opposing phase to the diaphragm of the second subwoofer speaker system 730b.

The housing of the dual underwater subwoofer system may be fabricated from material with a high thermal conductivity, to cool air inside the sound system 700. In one non-limiting example, the housing may be fabricated out of aluminum 6061 T6. In use, the underwater subwoofer 700 is typically surrounded by water 780. As disclosed above, the two subwoofer sound systems 730a,b may operate in an isobaric push-pull mode, in which the diaphragms both move together in a single direction (either anterior or posterior) thereby keeping a constant volume between cones. To maintain the volume, air may be displaced through a sealed channel 740 and a central path 782 that is in thermal communication with the exterior water 780. Because the magnets and sealed channel 740 are surrounded by water 780 their temperature cannot exceed 100 degrees C. The housing having a high temperature conductively can also essentially cool the gas inside.

Each subwoofer speaker system 730a,b may be driven only by half of the current or a quarter of the power of a single subwoofer system sound device. As a result, each subwoofer speaker system 730a,b produces only a quarter of the temperature of a single subwoofer device. As a result, each subwoofer speaker system 730a,b of the dual subwoofer sound source 700 will not suffer as much thermal degradation as the single subwoofer speaker driven at its maximum power. Therefore, each subwoofer speaker system 730a,b will be able to operate for a longer time and at a greater power compared to the single subwoofer speaker system.

Dual-Resonance Dual-Aperture Subwoofer System

Figure 8:
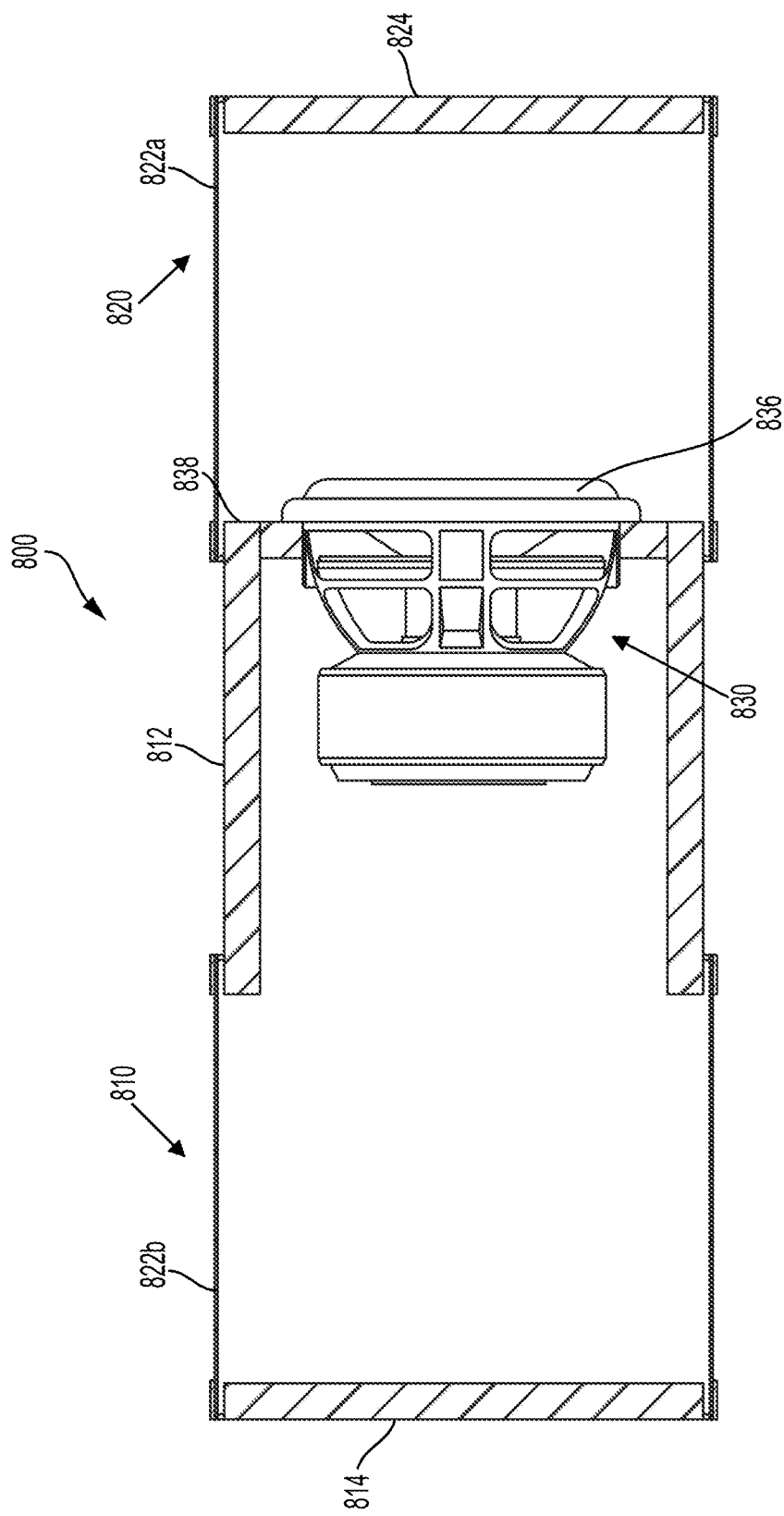
FIG. 8 is a diagram of one aspect of a dual bubble submersible sound system comprising subwoofer speaker system according to the present disclosure.

A dual resonance dual aperture system is depicted in FIG. 8. The dual resonance subwoofer system 800 is similar to the basic subwoofer system 100 as depicted in FIG. 1 and disclosed above, except the dual resonance subwoofer system 800 also includes a second bubble source 810 at the posterior end. Many of the features of the dual resonance system 800 are similar to those found in the basic subwoofer system 100.

The dual resonance sound system 800 includes a first cylindrical bubble source 820 at an anterior end and a second cylindrical bubble source 810 at a posterior end. The first cylindrical bubble source 820 is composed of a first cylindrical elastic polyurethane membrane 822a that is affixed at an anterior end of a cylindrical housing 812. The first cylindrical bubble source 820 also includes an end cap 824 that is sealed at the anterior end of the first elastic membrane 822a. In some aspects, the end cap 824 may be a solid piece. In some aspects, the end cap 824 may also include a deformable membrane. The second cylindrical bubble source 810 is composed of a second cylindrical elastic polyurethane membrane 822b that is affixed at a posterior end of a cylindrical housing 812. The second cylindrical bubble source 810 also includes an endpiece 814 that is sealed at a posterior end of the second elastic membrane 822a-b. In some aspects, the endpiece 814 may be a solid piece. In some aspects, the endpiece 814 may also include a deformable membrane. Both of the first cylindrical bubble source 820 and the second cylindrical bubble source 810 are configured to be filled with gas. In some aspects, an acoustic resonance of the first cylindrical bubble source 810 may differ from the acoustic resonance of the second cylindrical bubble source 820. In some aspects, an acoustic resonance of the first cylindrical bubble source 810 may be the same as the acoustic resonance of the second cylindrical bubble source 820.

Disposed within the submersible sound system 100 is a subwoofer speaker system 830. In some aspects, the subwoofer speaker system 830 is disposed at a posterior end of the cylindrical housing 812. The subwoofer speaker system 830 is composed of a magnet assembly, a frame, a voice coil (not illustrated), and a speaker diaphragm 836. The frame is configured to support the magnet assembly and the speaker diaphragm 836. The magnet assembly is disposed within the cylindrical housing 812. The subwoofer speaker system 830 is supported in the housing 812 by means of a subwoofer speaker support. It may be understood that the second bubble source 8100 may also be maintained in a sealed configuration defined by the end cap 814, the second cylindrical elastic membrane 822b, a posterior surface of the subwoofer speaker support 838, and a posterior surface of the diaphragm 836. The elastic membranes 822a-b may respectively separate the driver vibrating the speaker diaphragm 836 from the buoyancy forces of the surrounding water and enable the speaker diaphragm 836 to be loaded uniformly.

The speaker diaphragm 836 is driven by the voice coil in response to receiving an AC electrical signal. The AC electrical signal may be sourced by a control circuit that may control an amplitude and a frequency of the AC electrical signal. The magnetic field developed within the voice coil due to the AC electrical signal may cause the voice coil and the diaphragm 836, to which the voice coil is attached, to move relative to a static magnetic field produced by the magnet assembly. When the diaphragm 836 is actuated by the voice coil, its motion perturbs the gas disposed within the first bubble source 820 and the second bubble source 810.

The system has two close resonances and shows a very high efficiency. The system consists from two bubble resonators 810, 820 excited by one subwoofer speaker 830. The second bubble resonator 810 may have larger volume and hence the lower resonance frequency than the first bubble resonator 820. By changing the length of rigid support tubing between the two cylindrical bubble resonators 820, 810, the low resonance frequency can be shifted and moved close to the high resonance frequency. By doing so, the submersible system may have a narrow output band and be extremely efficient. The dual resonance dual aperture underwater subwoofer is very suitable in applications in which a large bandwidth output is unnecessary, but high sound pressure levels are desired. However, the dual resonance structure of the frequency response makes the frequency bandwidth large enough for applications such as long range underwater positioning and ocean acoustic tomography.

Figure 9:
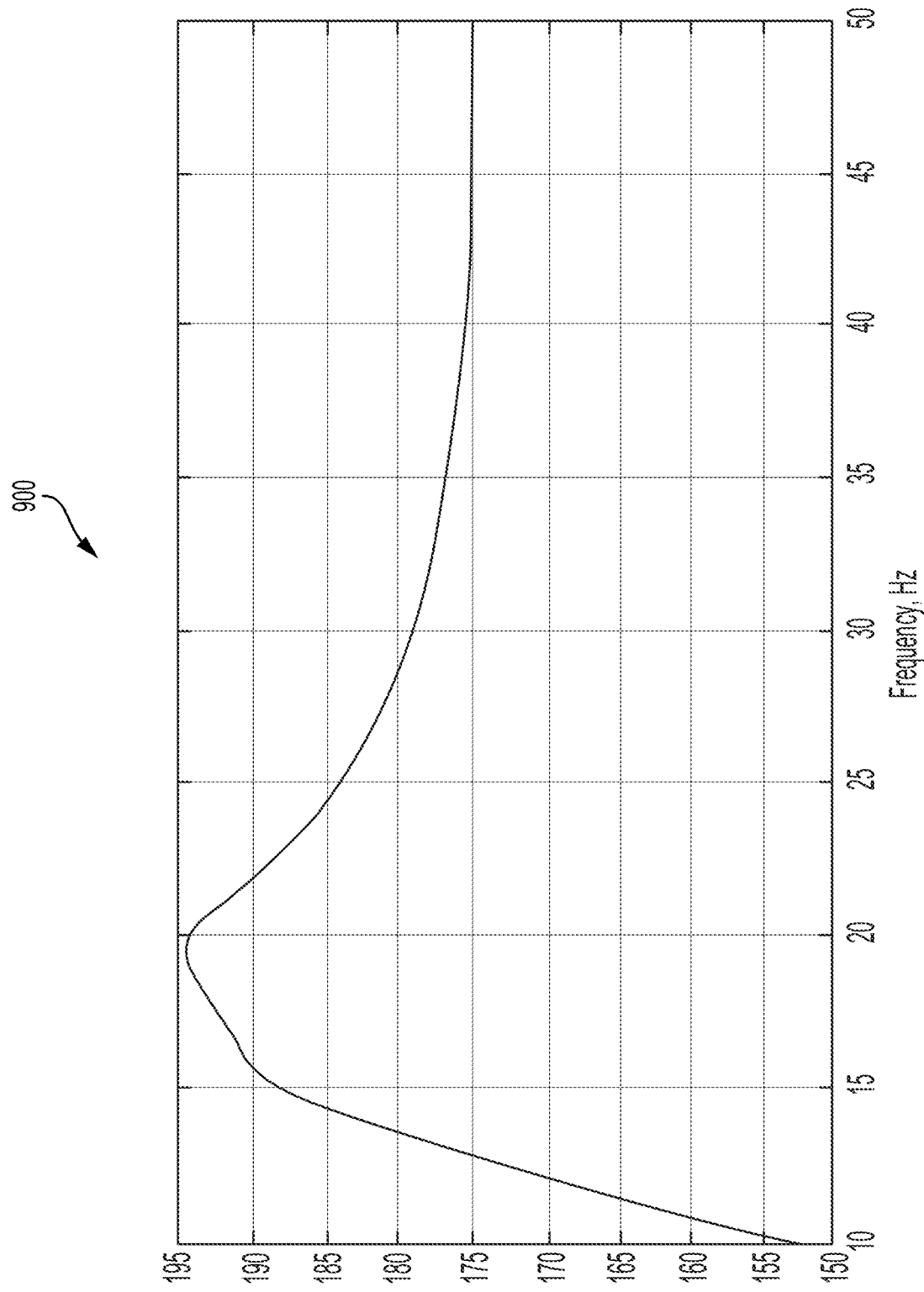
FIG. 9 is a frequency versus sound pressure plot for the response of the dual bubble submersible sound system of FIG. 8 according to the present disclosure.

FIG. 9 shows a power versus frequency graph 900 for a simulation of the dual resonance sound system 800. The simulation parameters of the subwoofer are the same as in the previous variants and shown in Table 1. Each bubble source (820 and 810 of FIG. 8) has a diameter 14" and a length of 10". A rigid aluminum tubing support structure (not shown) of the elastic membranes 822a,b is also 10" in length. As can be observed in the graph 900, this sound source shows very high signal in the low frequency band from 14 to 24 Hz. It shows very high efficiency 10% and high SPL (>190 dB) in this narrow frequency band. The band can be expanded if a subwoofer having a heavy aluminum diaphragm with a very low frequency resonance is used.

The two resonators of the dual resonance sound system 800 are connected through a subwoofer driver. As shown in FIG. 8, the subwoofer system 800 has two sides and it operates similarly to a piston. When the subwoofer/speaker cone is moving to the right, this movement may compress air in the right side or chamber and expand air behind the cone in the left side or chamber. Conversely, when the cone moves back such as back to the left, this compresses air behind the speaker and expands air in the right side. In this way, when the subwoofer is placed in the hole of the wall between the two bubble resonators, the subwoofer can excite both of the resonators simultaneously or substantially simultaneously, but in opposing directions.

The two bubble resonators may be tuned to two different frequencies, $F_1$ and $F_2$. They may have the same membrane dimensions and have different bubble volumes, as shown in the FIG. 16. Generally, however, both bubble resonators may have different volumes and different areas of their membranes. The resonance frequency $f_r$ of the bubble resonator is defined by Equation 14:

$$f_r = \frac{1}{2\pi}\sqrt{\frac{AP\gamma}{\rho_a RV}} \qquad \text{Equation 14}$$

Different volumes of the resonators allow them to be tuned to two different frequencies in conjunction with setting their resonances close to each other. Such a dual-resonance system will beneficially have an expanded frequency band while remaining very powerful and efficient. For typical resonance frequency and phase responses, the dual-resonance system may generate a radiated signal of the same phase relative to the two resonators. The radiated signal may generated so that speaker impedance of the dual resonance sound system 800 matches the radiation impedance of water. Because the speaker cone is moving between the two resonators, the cone shrinks one volume and expands another at the same time. In other words, the cone excites the resonators in opposite phases. But oscillations higher than the resonance frequency will be shifted in phase counterclockwise while oscillations lower than the resonance frequency will be shifted in phase 90 degrees clockwise. As result, between resonances, the radiated signal will be in one phase from both resonators so the double resonance sound system 800 will radiate very well. As described above, the elastic membranes 822a,b may be flexible members. On the other hand, the end cap 814 can be rigid and not moving. The cylindrical housing of the two cylindrical bubble resonators 820, 810 also can be rigid or fixed and not moving.

The volume behind the speaker is compressing even when the speaker cone moves but is not radiating a signal. As discussed herein, the tuning pipe may vent the subwoofer enclosure to act as phase invertor so that motion is inverted back and used in the main bubble resonator. Alternatively, the chamber behind the speaker also has a bubble radiating to the water using the back-and-forth motion of the cone (e.g., as the cone moves back) for the radiation. This way, sound waves are radiated by the two bubbles, in which each bubble uses the same speaker cone moving between the two bubbles.

Underwater Subwoofer Sound System with Heat Sinks

Figure 10:
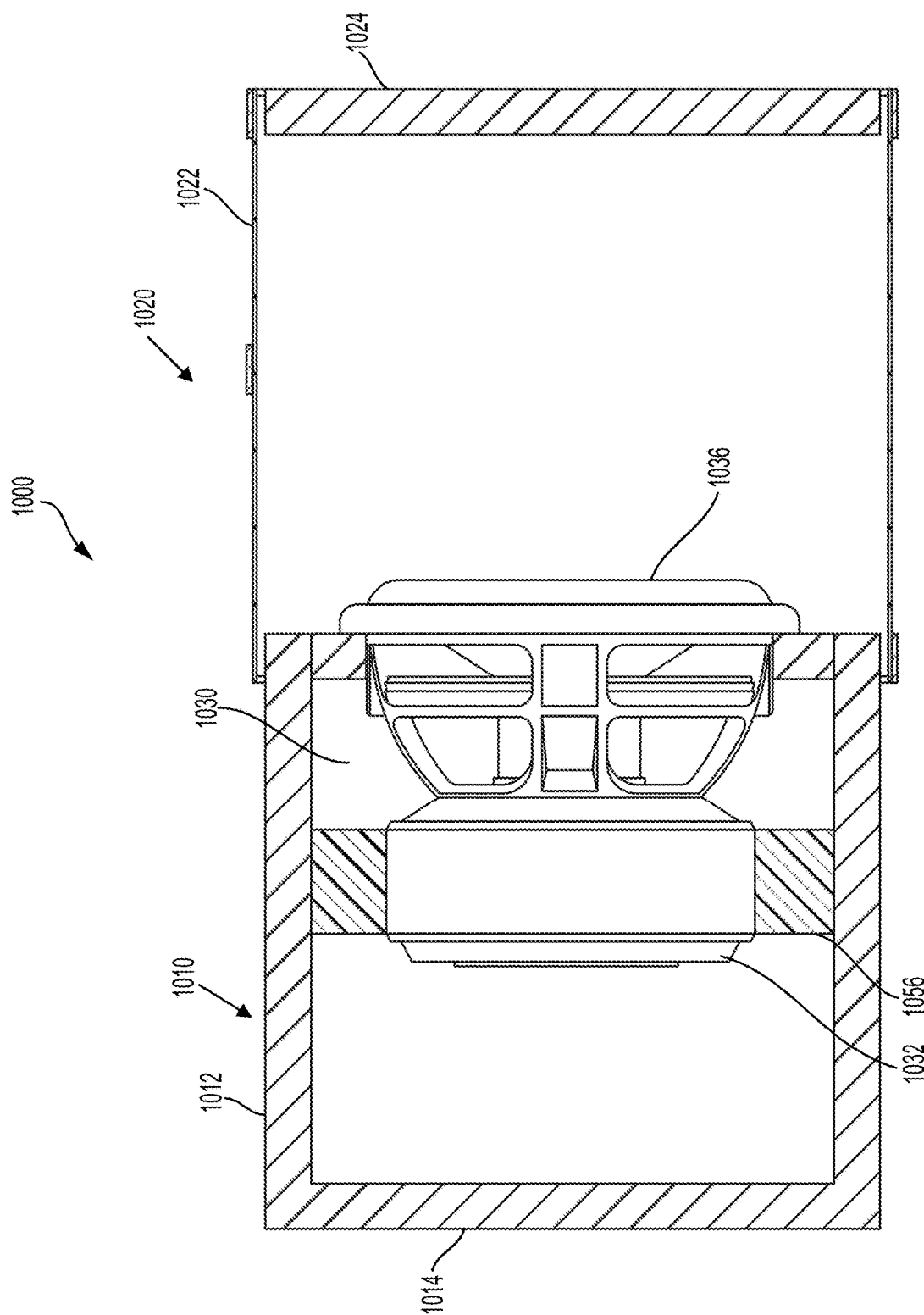
FIG. 10 is a diagram of one aspect of a submersible sound system comprising a subwoofer speaker system having a magnet assembly heat sink according to the present disclosure.

FIG. 10 depicts a design similar to that of the basic subwoofer sound source as depicted in FIG. 1 and disclosed above.

The submersible sound system 1000 includes a sealed chamber 1010 at a posterior end and a cylindrical bubble source 1020 at an anterior end. The sealed chamber 1010 is composed of a cylindrical housing 1012 to which a housing end piece 1014 is affixed at a posterior end of the cylindrical housing 1012. The cylindrical bubble source 1020 is configured to be filled with gas. The cylindrical bubble source 1020 is composed of a cylindrical elastic polyurethane membrane 1022 that is affixed at an anterior end of the cylindrical housing 1012. The cylindrical bubble source 1020 also includes an end cap 1024 that is sealed at the anterior end of the elastic membrane 1022. The elastic membrane 1022 may separate the subwoofer driver from the buoyancy forces of the surrounding water and enable a speaker diaphragm 1036 to be loaded uniformly. In some aspects, the end cap 1024 may be a solid piece. In some aspects, the end cap 1024 may also include a deformable membrane.

Disposed within the submersible sound system 1000 is a subwoofer speaker system 1030. The subwoofer speaker system 1030 is composed of a magnet assembly 1032, a frame, a voice coil (not illustrated), and the speaker diaphragm 1036. The frame is configured to support the magnet assembly 1032 and the speaker diaphragm 1036. The magnet assembly 1032 is disposed within the sealed chamber 1010 at the posterior end of the submersible sound system 1000. The subwoofer speaker system 1030 is supported in the housing 1010 by means of a subwoofer speaker support. The sealed chamber 1010 is maintained in a sealed configuration by means of the cylindrical housing 1012, the housing end piece 1014, a posterior end of the subwoofer speaker support, and a posterior surface of the diaphragm 1036.

The speaker diaphragm 1036 is driven by the voice coil in response to receiving an AC electrical signal. The AC electrical signal may be sourced by a control circuit that may control an amplitude and a frequency of the AC electrical signal. The magnetic field developed within the voice coil due to the AC electrical signal may cause the voice coil and the diaphragm 1036, to which it is attached, to move relative to a static magnetic field produced by the magnet assembly 1032. When the diaphragm 1036 is actuated by the voice coil, its motion perturbs the gas disposed within the bubble source 1020. It may be understood that the bubble source 1020 may also be maintained in a sealed configuration defined by the end cap 1024, the cylindrical elastic membrane 1022, an anterior surface of the subwoofer speaker support, and an anterior surface of the diaphragm 1036.

The housing 1012 of the underwater subwoofer system 1000 may be fabricated from material with a high thermal conductivity to cool air inside subwoofer 1030. In one aspect, the housing 1012 may be fabricated from aluminum 6061 T6. In use, the underwater subwoofer 1000 is surrounded by water. The housing 1012 fabricated with a high temperature conducting material may cool air inside of the device by heat exchange with the external water. In addition to the thermally conductive housing 1012, the underwater subwoofer system 1000 may include one or more heat sinks 1056 in thermal communication with both the magnet assembly 1032 and the housing 1012. In one example, the one or more heat sinks 1056 may be composed of copper. In another example, the one or more heat sinks 1056 may be fabricated as heat ducts. If additional thermal conduction is required, the one or more heat sinks 1056 may be implemented as one or more short heat pipes. The thermal conductivity of the one or more heat sinks 1056 may additionally lower temperature, improve temperature balance inside the subwoofer enclosure, and increase the root means square (RMS) power. Copper has a thermal conductivity of about 385 [W/Km]. If a heat sink has a length 5 mm and has a cross-sectional area of about 0.001 sq. m, and if eight are used with the magnet system, then a 2 kW excitatory signal is applied to the subwoofer speaker system, then the subwoofer frame temperature would only rise about 32.5 degrees C. higher than surrounding water temperature. Such thermal control of the subwoofer speaker system would permit reliable use for a long time. It may be recognized that the one or more heat sinks 1056 and/or the highly thermal conductive housing 1013 may be included into any of the submersible subwoofer systems disclosed either above or below.

Underwater Subwoofer System with Band-Pass Resonator

Figure 11:
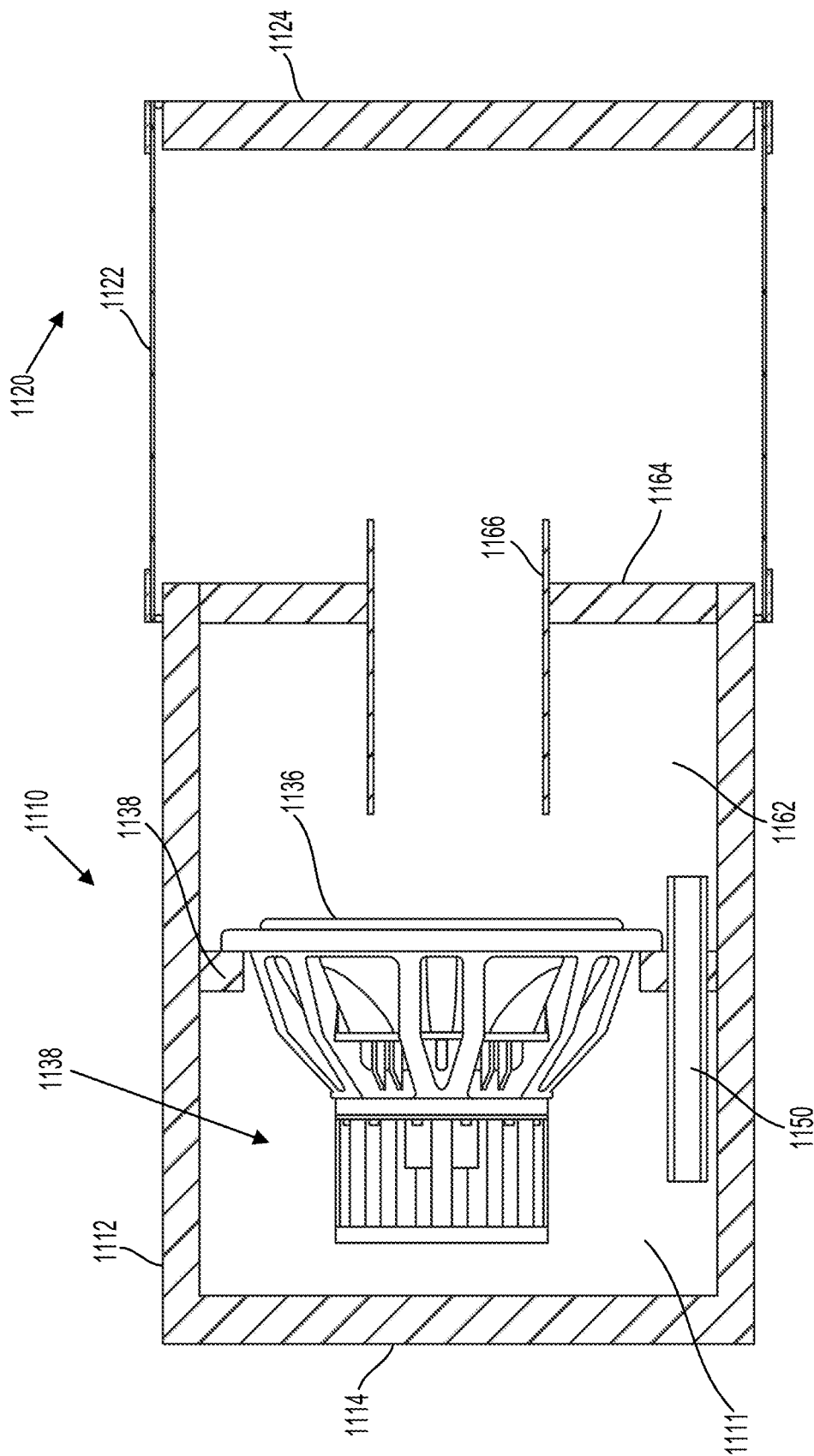
FIG. 11 is a diagram of one aspect of a submersible sound system comprising a subwoofer speaker system having an anterior place Helmholtz resonator according to the present disclosure.

FIG. 11 depicts a band-pass submersible subwoofer sound system 1100. The band-pass submersible subwoofer sound system 1100 is similar to the vented subwoofer system 400 with the addition of a second Helmholtz resonator disposed anterior to the subwoofer speaker system.

The band-pass submersible sound system 1100 includes a posterior enclosure 1111 at a posterior end and a cylindrical bubble source 1120 at an anterior end. The posterior enclosure 1111 is composed of a posterior portion of a cylindrical housing 1112 to which a housing end piece 1114 is affixed at a posterior end of the cylindrical housing 1112. The cylindrical bubble source 1120 is configured to be filled with gas so that sound can be radiated into the water through the gas-filled cylindrical bubble source 1120. The cylindrical bubble source 1120 is composed of a cylindrical elastic polyurethane membrane 1122 that is affixed at an anterior end of the cylindrical housing 1112. The cylindrical bubble source 1120 also includes an end cap 1124 that is sealed at the anterior end of the elastic membrane 1122. The elastic membrane 1122 may separate the subwoofer driver from the buoyancy forces of the surrounding water and enable a speaker diaphragm 1136 to be loaded uniformly. In some aspects, the end cap 1124 may be a solid piece. In some aspects, the end cap 1124 may also include a deformable membrane.

Disposed within the band-pass submersible sound system 1100 is a subwoofer speaker system 1130. In some aspects, the subwoofer speaker system 1130 is disposed in a posterior end of the cylindrical housing 1112. The subwoofer speaker system 1130 is composed of a magnet assembly, a frame, a voice coil (not illustrated), and a speaker diaphragm 1136. The frame is configured to support the magnet assembly and the speaker diaphragm 1136. The magnet assembly is disposed within the posterior enclosure 1111 at the posterior end of the band-pass submersible sound system 1100. The subwoofer speaker system is supported in the posterior enclosure 1111 by means of a subwoofer speaker support 1138. The posterior enclosure 1111 is thus composed of a posterior portion of the housing 1112, the housing end piece 1114, a posterior portion of the subwoofer speaker support 1138, and a posterior surface of the speaker diaphragm 1136.

The speaker diaphragm 1136 is driven by the voice coil in response to receiving an AC electrical signal. The AC electrical signal may be sourced by a control circuit that may control an amplitude and a frequency of the AC electrical signal. The magnetic field developed within the voice coil due to the AC electrical signal may cause the voice coil and the diaphragm 1136, to which it is attached, to move relative to a static magnetic field produced by the magnet assembly.

The band-pass submersible sound system 1100 includes a resonator end wall 1164 at the anterior end of the housing 1112. The portion of the housing 1112 bounded by the resonator end wall 1164 and the anterior surface of the diaphragm 1136 defines a Helmholtz resonator chamber 1162, that, together with a resonator throat 1166, forms a Helmholtz resonator. The resonator throat 1166 acoustically and fluidically couples the resonator chamber 1162 with the cylindrical bubble source 1120. It may be understood that the bubble source 1120 may be maintained in a sealed configuration defined by the end cap 1124, the cylindrical elastic membrane 1122, and an anterior surface of the resonator end wall 1164. When the diaphragm 1136 is actuated by the voice coil, its motion perturbs the gas disposed within the resonator chamber 1162.

The band-pass submersible sound source 1100 may also include a tuning pipe 1150 to vent the sealed compartment 1111 to the Helmholtz resonator chamber 1162. In some aspects, the tuning pipe 1150 is disposed within the subwoofer speaker support 1138 and extends between the sealed compartment 1111 and the Helmholtz resonator chamber 1162. The tuning pipe 1150 may be configured to permit fluidic communication between the sealed compartment 1111 and the Helmholtz resonator chamber 1162.

Figure 12:
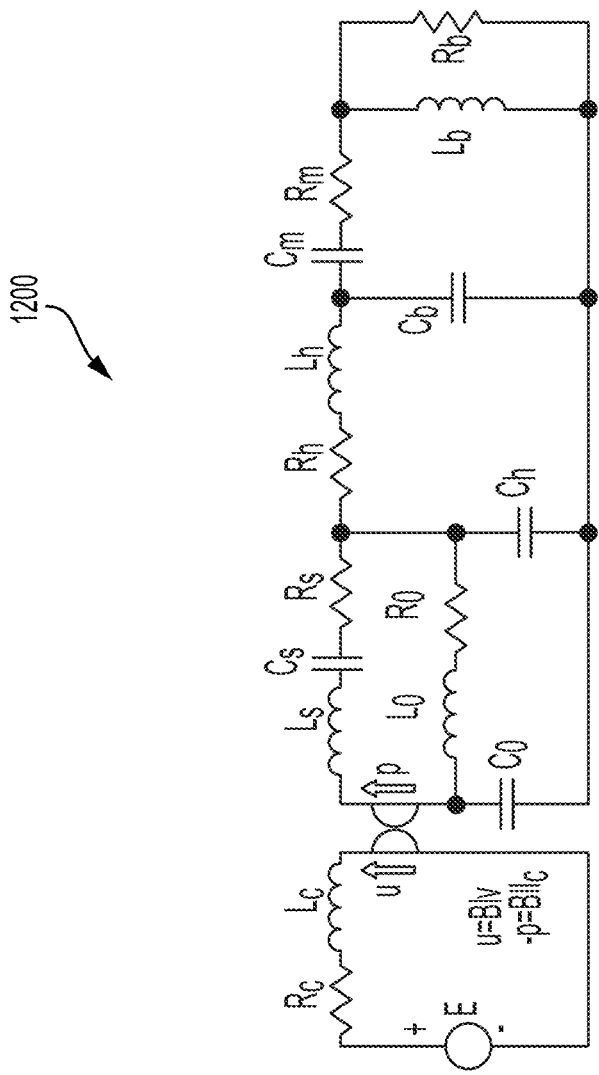
FIG. 12 depicts an equivalent electrical circuit for the submersible sound system of FIG. 11 according to the present disclosure.

FIG. 12 depicts an equivalent electrical circuit 1200 for the band-pass submersible sound source 1100. The applicable equations are described above with reference to FIG. 2. For the Helmholtz resonator, $R_0 = \omega_r L_h / Q_h$, Q, is the Q factor of the Helmholtz resonator; ifr is the resonance frequency of the Helmholtz resonator; $L_h = l_h \rho_a / A_h$; l, is the length of the Helmholtz port and A, is the area of the Helmholtz port; $C_h = V_h / (\gamma P_b)$; $V_h$ is the volume of the Helmholtz resonator; and r=1.4 is the adiabatic constant. The resonance frequency of the Helmholtz resonators: $\omega_r = 1/\sqrt{L_m \rho_{atm} V_h / (\gamma P_{atm} A_h)}$, where $\rho_{atm}$, $P_{atm}$ are the atmospheric density and pressure of air. The resonance frequency remains approximately the same at all depth. This makes frequency response of the sound source more stable.

For purposes of simulating the behavior of the band-pass submersible subwoofer sound source 1100, simulation parameters for the subwoofer are the same as those given in Table 1 and the simulation parameters for the enclosure given in Table 4 below. The bandpass resonator differs from the sealed and vented variants only by the additional Helmholtz chamber with the narrow throat that is place anteriorly to the subwoofer speaker system 1130.

Figure 13:
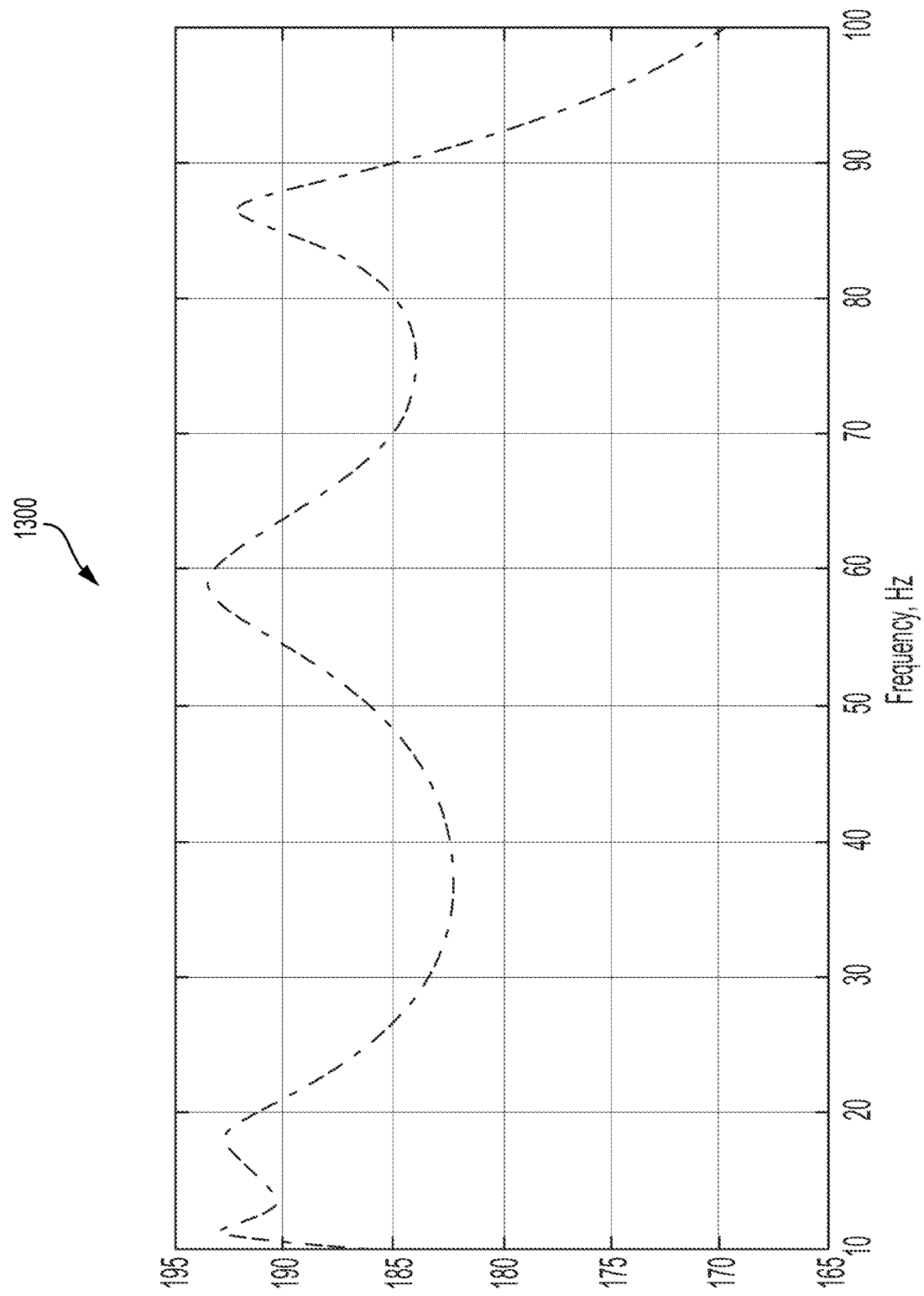
FIG. 13 is a frequency versus sound pressure plot for the response of the submersible sound system of FIG. 12 according to the present disclosure.

FIG. 13 presents a graph 1300 of sound pressure versus frequency of the band-pass submersible sound system 1100 operating at a depth of 8 m. The band-pass resonator expands frequency band to range from 12 Hz to 92 Hz. The frequency response does not appear to be sensitive to the water depth because Helmholtz resonances do not depend on depth. The bandpass resonator filters all harmonics out of the band and cleans the harmonic content.

TABLE 4

| Enclosure | |
|---|---|
| Diameter of the cylindrical hull, inch | 14 |
| Length of the motor box, inch | 14 |
| Volume of the box, L | 35 |
| Length of the bubble membrane, inch | 10 |
| Volume of the bubble, L | 25 |
| Area of the membrane, sq. m | 0.28 |
| Hardness of the membrane, | 70 A |
| Thickness of the membrane, mm | 3.17 |
| Length of the box port pipe, inch | 14 |
| Diameter of port, inch | 1 |
| Length of the Helmholtz chamber, inch | 10 |
| Diameter of the Helmholtz throat, inch | 3 |
| Length of the Helmholtz throat, inch | 12 |
| Water depth, m | 6 |

Figure 14:
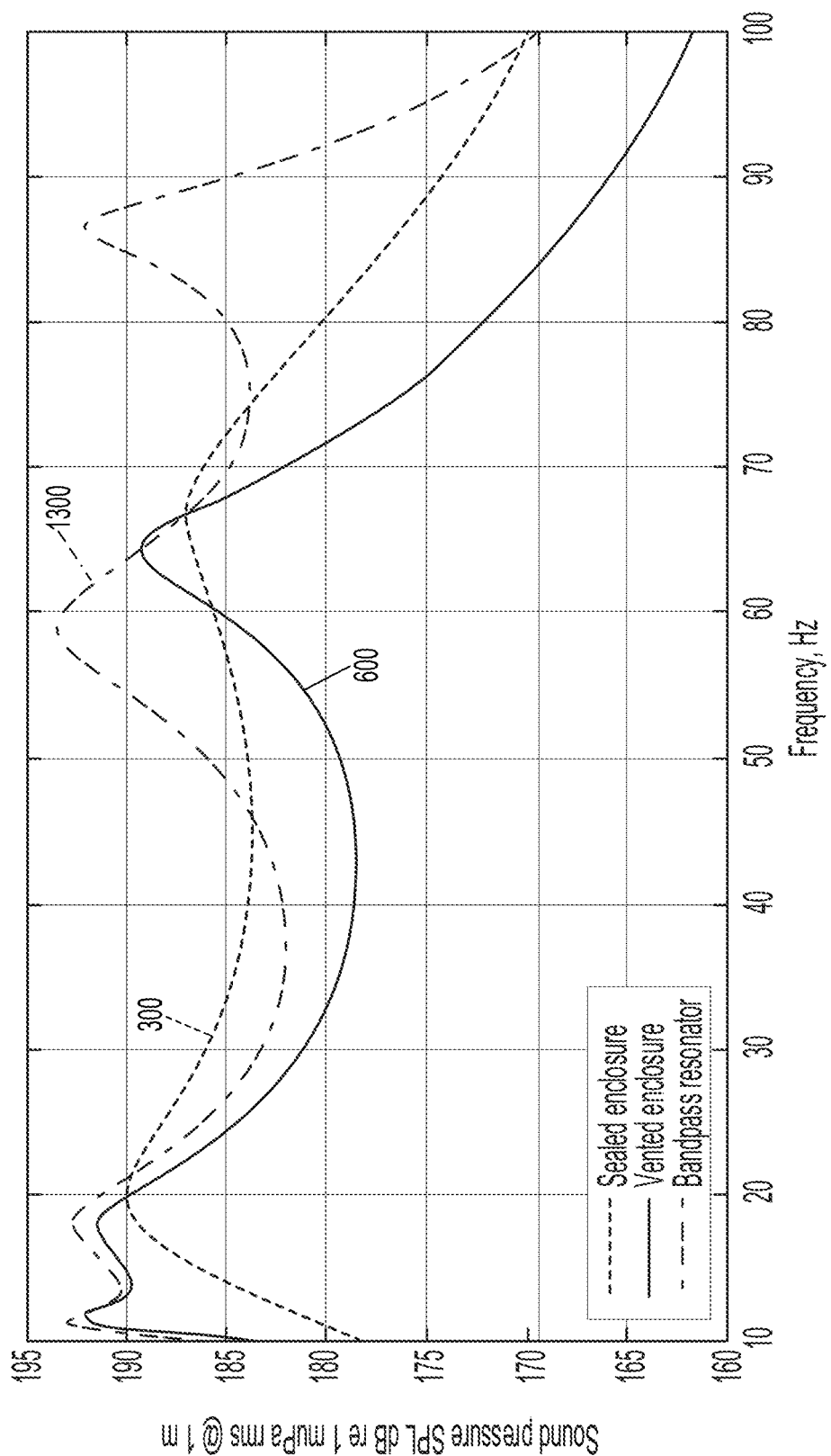
FIG. 14 is a frequency versus sound pressure plot comparing the frequency outputs of the aspects of the submersible sound systems depicted in FIGS. 1, 4, and 11 according to the present disclosure.

FIG. 14 presents a comparison of the simulated responses of the basic subwoofer system (300), of the vented subwoofer system (600) and the band-pass subwoofer system (1300). All three underwater subwoofers were excited by 2 kW signals and operated at an 8 m depth. All of the simulations used the same parameters for the subwoofer. The enclosure parameters for the simulations were derived from Table 2 (for the basic design), Table 3 (for the vented enclosure) and Table 4 (for the band-pass enclosure). It may be observed that the addition of the tuning pipe shifted the frequency response to lower frequencies and the addition of the anterior Helmholtz resonator expanded the high frequency range of the subwoofer systems. It may be understood that a submersible subwoofer sound system may incorporate any one or more of the tuning pipes and/or Helmholtz resonators.

The Helmholtz resonator throat and Helmholtz resonator chamber may form the Helmholtz resonator with a resonance frequency that is higher than the frequency of the bubble resonance. The resonance frequency of the Helmholtz resonator may be seen in FIG. 13 from the first maximum peak (from the right side of the graph in FIG. 13) of the frequency response. As indicated in the graph, this resonance frequency can be a very high frequency and it can expand the frequency response to 87 Hz. The volume of Helmholtz resonator works like compliance and the air in the tuning pipe works as inertia. Volume may be calculated relative to the Helmholtz chamber while length and cross area are calculated relative to the tuning pipe. Equation 15 shows how resonance frequency is related to the length of the tuning pipe and the cross section area.

$$f_r = \frac{1}{2\pi} \sqrt{\frac{AP\gamma}{\rho_a l V}},$$

Equation 15

Underwater Subwoofer System with Band-Pass Resonator and Computer Control

Figure 15:
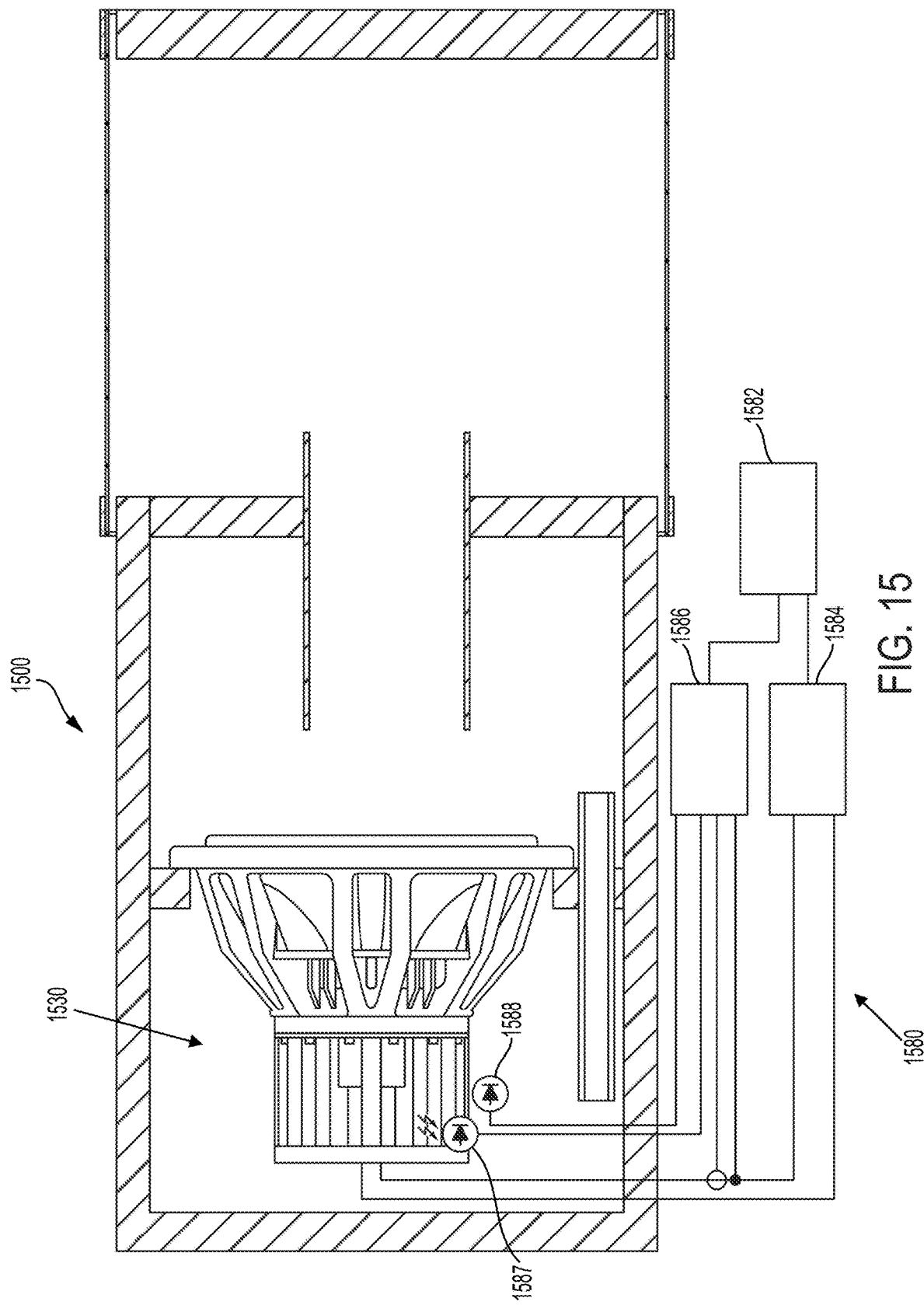
FIG. 15 depicts an aspect of the submersible sound system of FIG. 11 including a sound system control system according to the present disclosure.

The operational reliability of the underwater subwoofer may be increased if it includes a set of sensors providing sensor data that can be used to control the input power transmitted to drive the subwoofer system. During a typical use of a submersible sound source, the acoustic drive may be required to have high reliability over a continuous use of hours and even days. Typical subwoofer speaker systems are designed for continuous operation over only a few hours and could readily over-heat if used over a longer duration. Therefore, it is desirable to include a controller that may control the operation of the subwoofer speaker system based on data received by the set of sensors in order to prevent overheating. FIG. 15 depicts a band-pass subwoofer sound system 1500 similar to the sound system 1100 depicted in FIG. 11 and disclosed above. It may be recognized that the control system 1580 depicted in FIG. 15 is not limited for use with the band-pass subwoofer sound system 1500 but may be used with any of the submersible subwoofer sound systems disclosed above, including, without limitation, the basic subwoofer system 100 (FIG. 1), the vented subwoofer system 400 (FIG. 4), the dual-subwoofer water cooled system 700 (FIG. 7), the dual-resonance/dual-aperture subwoofer system 800 (FIG. 8), and the subwoofer sound systems containing heat sinks 1000 (FIG. 10). In the case of the dual-subwoofer sound system 700, a single controller may control each of the subwoofer speaker systems and have separate sensors associated with each. Alternatively, each subwoofer speaker system of the dual-subwoofer sound system may be controlled by a separate controller. In some aspects, each of the separate controllers may be configured to communicate with the other controller in order to coordinate the phasing of the drive signals transmitted to each of the respective subwoofer speaker systems.

As depicted in FIG. 15, the controller may be composed of several components including, without limitation, a processor, a memory unit in data communication with the processor, a controllable power source or power amplifier 1584 configured to source a current to drive the voice coil of the subwoofer speaker system 1530, and an interface to receive sensor input data from a plurality of sensors. In one non-limiting example, the interface may include an analog to digital converter 1586.

The set of sensors may include any one or more sensors that may provide sensor input data to assist the processor in controlling the power transmitted by the power source 1584. Non-limiting examples of such sensors may include a sensor of the output current of the power source 1584 and a sensor of an output voltage of the power source 1584. In some aspects, one or more of the sensor of the output current and the sensor of the output voltage may be incorporated in the controller 1580. In some aspects, one or more of the sensor of the output current and the sensor of the output voltage may be incorporated in the subwoofer speaker assembly 1530. In another aspect, one or more of the sensor of the output current and the sensor of the output voltage may be separate devices.

In addition, the set of sensors may include sensors configured to measure parameters related to the operation of one or more components of the subwoofer speaker assembly 1530. In one example, the set of the sensors may include a temperature sensor 1587 of the voice coil. The temperature sensor 1587 of the voice coil may be an infrared (IR) temperature sensor that does not make physical contact with the voice coil while it moves. In another example, the sensors may include a temperature sensor 1588 configured to measure a temperature of the magnet assembly within the subwoofer speaker system 1530. In one example, the temperature sensor 1588 may have direct contact with the magnet assembly. In another example, the temperature sensor 1588 may detect a temperature of the air or gas in contact with the magnet assembly. In another example, the set of sensors may include a sensor configured to measure a displacement of the diaphragm during the operation of the subwoofer speaker system 1530.

It may be recognized that additional sensors may be used to monitor additional conditions of the submersible subwoofer sound system. The present disclosure is not to be taken to limit such sensors to only those explicitly described herein.

The memory component of the controller may include instructions that, when executed by the controller processor, may cause the processor to receive sensor input data from the sensors and control an output of the power source 1584 based on the output sensor. The input sensor data may include data from the output current sensor, the output voltage sensor, the temperature sensors 1587, 1588 or any other sensors. It may be understood that if the power or temperature conditions of the subwoofer exceed a defined safety limit, the processor will cause the power source 1584 to decrease its output power, increase the duty cycle of the output signal, or shut off the subwoofer speaker system 1530 until the conditions are within the defined safety limit.

The full dynamics of the subwoofer cone can be measured by using the sensors to sense the current and voltage on the speaker. The back electromotive force (back EMF voltage) can be calculated as the product of the Bl-factor or motor force and the voltage of the input signal. The product of the current (Ic) and the Bl yields the force applied on the cone. The simple electric current circuit model can be used to determine or calculate any other dynamic parameters based on these two parameters of EMF voltage and current. In general, when the controller causes current to be limited, this also limits the force applied on the cone and so that the force is maintained within safe limits. By measuring the back EMF and controlling the power source 1584, the speed of the cone may be limited. Consequently, the amplitude of the cone's excursion can be limited so that the cone does not exceed its safe limits.

In the subwoofer speaker system 1530, the rate at which the temperature of the voice coil increase may be a faster rate compared to the respective rate of other part of the subwoofer speaker system 1530. In particular, the voice coil can have a temperature up to 250 degrees Celsius. The temperature of the voice coil can reach such maximum levels for approximately two to three second. When the underwater subwoofer is used at maximum power, it moves such that its temperature should be measured with a suitable infrared remote sensor, such as the MLX90621 available from Melexis Technologies. The temperature in the magnet assembly and subwoofer enclosure can be measured by a suitable digital temperature sensor such as the ADT7301 available from Analog Devices. As discussed herein, the controller may be programmed to implement temperature control to prevent overheating, for example. Also, one or more copper temperature conductors can be provided to cool the magnet assembly and frame of the subwoofer with the surrounded water.

Realized Example of a Submersible Subwoofer System

Figure 16:
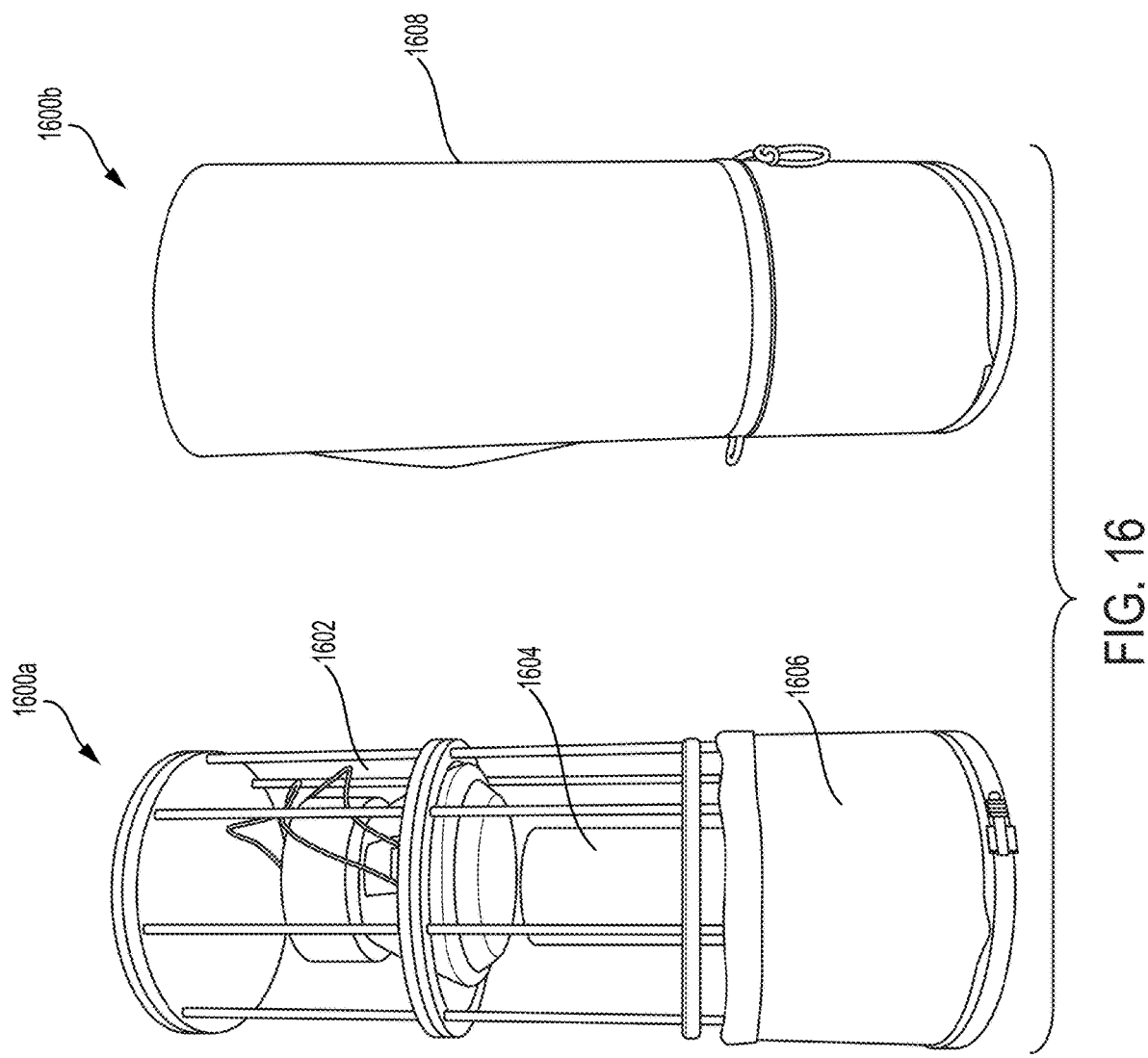
FIG. 16 illustrates an aspect of a submersible sound system according to the present disclosure

One example of an experimental submersible subwoofer sound system is depicted in FIG. 16 in an open configuration 1600*a* and in an enclosed configuration 1600*b*. The realized subwoofer sound system has a modular construction and includes sealed (or vented) subwoofer enclosure 1602 at the posterior end, a Helmholtz resonator 1604 disposed in the middle, and bubble resonator 1606 at the anterior end. The experimental system includes multiple internal round plates bolted together with rods. The internal structure may slide inside a rigid carbon-fiber pipe 1608. By changing the position and number of plates, the realized subwoofer sound system can be transformed into any of the considered subwoofer variants: sealed, vented, or band-pass. Experiments conducted using the experimental system show good agreement with the simulated models.

Clustered Subwoofer System

Figure 18:
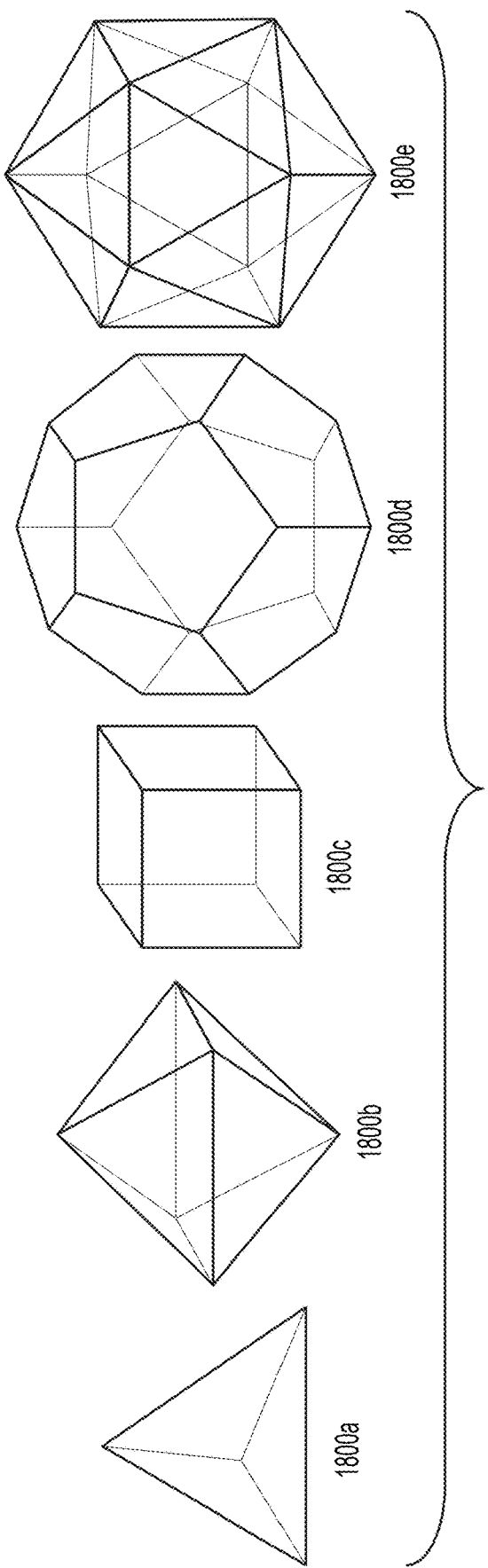
FIG. 18 depicts a variety of regular polyhedra defining positions of the sound sources disposed about the underwater sound system depicted in FIG. 18 according to the present disclosure.

During testing of the practical underwater subwoofer sound system, it was determined that, when a distance between two subwoofers is greater than 4-5 diameters, the subwoofer acoustic pressure outputs do not couple but rather directly sum. As a result, the sound pressure outputs together may have an acoustic power about 6 dB greater than that from the individual sound systems. Each submersible sound system will act as if the neighboring sound source does not exist and each sound source will receive the same power from the power source. As a result, the total acoustic power of the combined underwater sound system will have about four times more acoustical power in the water than the sound sources individually. The efficiency of such system will be twice higher. The total efficiency of the cluster of N submersible subwoofer sound source located at the distance 4-5 times larger than their diameter will be N times larger. In order for a cluster of such sound sources to create a spherical wave in the water, the individual sound sources may be mounted at identical distances from each other and have the same distance from a common phase center defined on a surface of an imaginary sphere. Such geometrical structures are known as congruent regular polyhedrals as depicted in FIG. 18. Such polyhedrals may include, without limitations, a tetrahedron 1800*a*, an octahedron 1800*b*, a cube 1800*c*, a dodecahedron 1800*d*, or an icosahedron 1800*e*.

Figure 17:
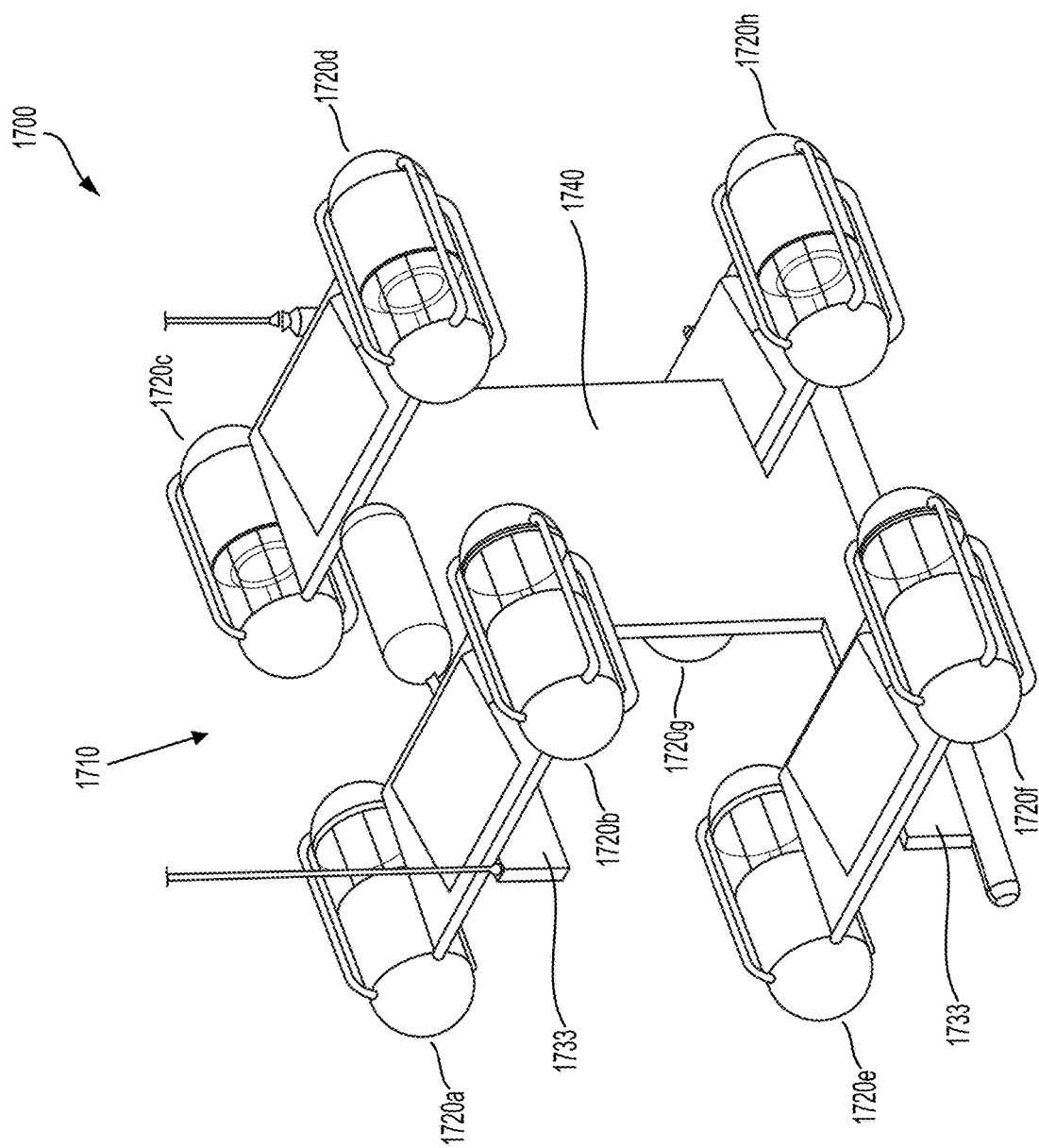
FIG. 17 depicts an aspect of an underwater sound system comprising a cluster of sound sources each having a subwoofer speaker system according to the present disclosure.

FIG. 17 depicts an illustration of an underwater sound system 1700 comprising a cluster of subwoofer sound sources 1720*a-f*. The subwoofer sound sources may be disposed on a support 1710 which may include any number of features configured to maintain the orientation of the subwoofer sound sources 1720*a-f* and permit smooth and stable towing of the sound system 1700 at high speed. In one example, the support 1710 may include features such as fin-depressors 1733 and a keel 1740. The subwoofer sound sources 1720*a-f* may be disposed at the vertices of a regular polyhedron. The regular polyhedron can be a cube, for example, as depicted in FIG. 17. Each of the subwoofer sound sources 1720*a-f* can radiate sound pressure 182 dB re 1 µPa at 1 m with an efficiency of about 0.7% from a 2 kW power amplifier. However, the cluster system 1700 may radiate sound pressure at 200 dB re 1 µPa at 1 m and will need 16 kW power amplifiers. The efficiency of the cluster will be 5.6%. Such clusters can be combined into array structures and create needed directivity patterns.

It may be recognized that the submersible subwoofer sound systems used in the clustered sound system 1700 may comprise any one of the subwoofer sound systems disclosed above including, without limitation, the basic subwoofer system, the vented subwoofer system, the band-pass subwoofer system, the water cooled dual subwoofer system, the dual aperture/dual resonance subwoofer system, with or without heat sinks. The subwoofer sound systems that together form the cluster may all comprise the same type of subwoofer sound system, or the sound systems may mix any one or more types of sound systems. Each of the subwoofer sound systems may have its own controller, such as 1580 (see FIG. 15). In some aspects, the individual controllers may be configured to communicate among themselves in order to coordinate the amplitude, frequency, and phase of their respective subwoofer speaker systems. In another aspect, a single controller may control each of the individual subwoofer speaker systems and receive sensor input data from each of them.

In cluster or array structure formations as described herein, the distances between bubble resonators may be so small compared with the wavelength of the wave created in the water such that all the resonators may effectively operate as one big bubble at one phase. Accordingly, systems of the present disclosure such as the clustered sound system 1700 advantageously have sound sources that are highly coherent. Another advantage is that the efficiency of the cluster is approximately proportional to a number of sources in the cluster. That is, the cluster sums the sound pressure from its constituent bubble resonators. For example, if the cluster includes a 1 Watt sound source with sound pressure $P_0$ and another 1 Watt source with the same sound pressure level $P_0$ is added to the cluster, the resulting sound pressure will be $2*P_0$ and the total power will be $(2P_0)^2$ or 4 watts. Thus, doubling the number of sources in a cluster will provide four times more energy from the same electric power. As such, providing a cluster so that the sources work together in the cluster is more efficient than efficiency of one source alone.

Having shown and described various aspects of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, the examples, aspects, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

While various details have been set forth in the foregoing description, it will be appreciated that the various aspects of the system and method for using sleep enhancement during sleep may be practiced without these specific details. One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Further, while several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. More-over, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

For conciseness and clarity of disclosure, selected aspects of the foregoing disclosure have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing disclosure, it is appreciated that, throughout the foregoing disclosure, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one form, several portions of the subject matter described herein may be implemented via an application specific integrated circuits (ASIC), a field programmable gate array (FPGA), a digital signal processor (DSP), or other integrated formats. However, those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative form of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In some instances, one or more elements may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other. It is to be understood that depicted architectures of different components contained within, or connected with, different other components are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated also can be viewed as being "operably connected," or "operably coupled," to each other to achieve the desired functionality, and any two components capable of being so associated also can be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In other instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present disclosure have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "one form," or "a form" means that a particular feature, structure, or characteristic described in connection with the aspect is included in at least one aspect. Thus, appearances of the phrases "in one aspect," "in an aspect," "in one form," or "in an form" in various places throughout the specification are not necessarily all referring to the same aspect. Furthermore, the particular features, structures or characteristics may be combined in any suitable manner in one or more aspects.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

Various embodiments are described in the following numbered examples:

Example 1. A submersible sound system comprising: a housing; a housing end piece in mechanical communication with a posterior end of the housing; an elastic membrane in mechanical communication with an anterior end of the housing; an end cap in mechanical communication with the elastic membrane; a subwoofer speaker system disposed within the housing. The subwoofer speaker system comprises: a magnet assembly disposed within the posterior end of the housing; a frame in mechanical communication with the magnet assembly; a voice coil; a diaphragm in mechanical communication with the frame and configured to be driven by the voice coil; a subwoofer speaker support in mechanical communication with the frame; and an interior portion of the housing, and wherein an anterior surface of the subwoofer speaker support, an anterior surface of the diaphragm, the anterior end of the housing, the elastic membrane, and the end cap together define a sealed cylindrical bubble sound source.

Example 2. The submersible sound system of Example 1, wherein the housing, the housing end piece, and a posterior surface of the subwoofer speaker support together form a sealed enclosure in the housing.

Example 3. The submersible sound system of Examples 1 or 2, comprising a tuning pipe disposed within the subwoofer speaker support, extending between the sealed enclosure and the cylindrical bubble sound source, and configured to permit fluidic communication between the sealed enclosure and the cylindrical bubble sound source.

Example 4. The submersible sound system of Example 3, wherein the tuning pipe and the sealed enclosure together comprise a Helmholtz resonator.

Example 5. The submersible sound system of any of Examples 1-4, comprising a second subwoofer speaker system disposed within the housing. The second subwoofer speaker system comprises a second magnet assembly disposed within the posterior end of the housing; a second frame in mechanical communication with the second magnet assembly; a second voice coil; a second diaphragm in mechanical communication with the second frame and configured to be driven by the second voice coil; and a second subwoofer speaker support in mechanical communication with the second frame and an interior portion of the posterior end of the housing, wherein the second subwoofer speaker system is disposed in an opposing direction to the subwoofer speaker system; and a sealed channel configured to permit fluidic communication between a posterior side of the frame and an anterior side of the second frame, wherein the diaphragm is a first diaphragm and the first diaphragm is configured to operate in opposition to the second diaphragm.

Example 6. The submersible sound system of any of Examples 1-5, comprising a second cylindrical bubble sound source comprising a second elastic membrane in mechanical communication with the posterior end of the housing at a first end of the second elastic membrane and in mechanical communication with the housing end piece at a second end of the second elastic membrane, wherein the second elastic membrane, the housing, the housing end piece, and a posterior surface of the subwoofer speaker support together form a sealed enclosure.

Example 7. The submersible sound system of any of Examples 1-6, further comprising one or more heat sinks in thermal communication with the magnet assembly and the housing.

Example 8. The submersible sound system of any of Examples 7, wherein the one or more heat sinks are configured to be positioned in proximity to water to cool the water.

Example 9. The submersible sound system of any of Examples 1-8, further comprising a gas disposed therein.

Example 10. The submersible sound system of any of Examples 1-9, wherein the end cap comprises an elastic portion.

Example 11. The submersible sound system of any of Examples 1-10, comprising a control system. The control system comprises a processor; a memory unit in data communication with the processor; a controllable power source in electrical communication with the voice coil; and an interface configured to receive sensor input data from the subwoofer speaker system; wherein the memory unit stores instructions that, when executed by the processor, cause the processor to: receive the sensor input data from the subwoofer speaker system; and control the power source based on the received sensor input data.

Example 12. The submersible sound system of any of Examples 11, wherein the subwoofer speaker system comprises a first temperature sensor of a first temperature of fluid surrounding the magnet assembly and a second temperature sensor of a second temperature of the voice coil.

Example 13. The submersible sound system of Example 12, wherein the second temperature sensor is an IR temperature sensor.

Example 14. The submersible sound system of any of Examples 12-13, wherein the sensor input data are received from one or more of the first temperature sensor and the second temperature sensor.

Example 15. The submersible sound system of any of Examples 11-15, comprising a sensor of an output current of the power source; and a sensor of an output voltage of the power source, wherein the memory unit stores instructions that, when executed by the processor, further cause the processor to: receive current data from the sensor of the output current; receive voltage data from the sensor of the output voltage; and control the power source based on the received current data and the received voltage data.

Example 16. A submersible sound system comprising: a housing; a housing end piece in mechanical communication with a posterior end of the housing; an elastic membrane in mechanical communication with an anterior end of the housing; an end cap in mechanical communication with the elastic membrane; a resonator end wall in mechanical communication with the anterior end of the housing; a resonator throat disposed within the resonator end wall; and a subwoofer speaker system disposed within the housing. The subwoofer speaker system comprises: a magnet assembly disposed within the posterior end of the housing; a frame in mechanical communication with the magnet assembly; a voice coil; a diaphragm in mechanical communication with the frame and configured to be driven by the voice coil; a subwoofer speaker support in mechanical communication with the frame and an interior portion of the housing; and a tuning pipe disposed within the subwoofer speaker support; wherein the housing, the housing end piece, and a posterior surface of the subwoofer speaker support together form a posterior enclosure, wherein an anterior surface of the resonator end wall, the anterior end of the housing, the elastic membrane, and the end cap together define a sealed cylindrical bubble sound source, wherein the anterior surface of the diaphragm, an anterior surface of the subwoofer speaker support, an anterior portion of the housing, the resonator end wall, and the resonator throat together define a Helmholtz resonator, wherein the resonator throat is configured to permit fluidic communication between the Helmholtz resonator and the cylindrical bubble sound source, and wherein the tuning pipe extends between the posterior enclosure and the Helmholtz resonator and is configured to permit fluidic communication between the posterior enclosure and the Helmholtz resonator.

Example 17. The submersible sound system of Example 16, comprising a control system. The control system comprises: a processor; a memory unit in data communication with the processor; a controllable power source in electrical communication with the voice coil; and an interface configured to receive sensor input data from the subwoofer speaker system; wherein the memory unit stores instructions that, when executed by the processor, cause the processor to: receive the sensor input data from the subwoofer speaker system; an control the power source based on the received sensor input data, an output voltage of the power source, and an output current of the power source.

Example 18. An underwater sound system comprising: a sound system support having a plurality of vertices and a plurality of sound sources. The plurality of vertices form the vertices of a regular polyhedron. Each of the plurality of sound sources comprise: a housing; a housing end piece in mechanical communication with a posterior end of the housing; an elastic membrane in mechanical communication with the anterior end of the housing; an end cap in mechanical communication with the elastic membrane; and a subwoofer speaker system disposed within the housing. The subwoofer speaker system comprises a magnet assembly disposed within the posterior end of the housing; a frame in mechanical communication with the magnet assembly; a voice coil; a diaphragm in mechanical communication with the frame and configured to be driven by the voice coil; and a subwoofer speaker support in mechanical communication with the frame and an interior portion of the housing. An anterior surface of the subwoofer speaker support, an anterior surface of the diaphragm, the anterior end of the housing, the elastic membrane, and the end cap together define a sealed cylindrical bubble sound source. Each one of the plurality of sound sources is affixed to each one of the plurality of sound system support vertices.

Example 19. The underwater sound system of Example 18, wherein the sound system support further comprises one or more suppressor fins and keels.

Example 20. The underwater sound system of claim 18, wherein the regular polyhedron comprises one of a tetrahedron, a cube, an octahedron, a dodecahedron, and an icosahedron.

What is claimed is:

1. A submersible sound system comprising:
  a first cylindrical bubble sound source comprising:
    a housing;
    a first elastic membrane in mechanical communication with an anterior end of the housing;
    an end cap in mechanical communication with the first elastic membrane;
    a subwoofer speaker system disposed within the housing, the subwoofer speaker system comprising:
      a magnet assembly disposed within the posterior end of the housing;
      a frame in mechanical communication with the magnet assembly;
      a voice coil;
      a diaphragm in mechanical communication with the frame and configured to be driven by the voice coil;
      a subwoofer speaker support in mechanical communication with the frame;
    and an interior portion of the housing,
    wherein an anterior surface of the subwoofer speaker support, an anterior surface of the diaphragm, the anterior end of the housing, the first elastic membrane, and the end cap together define a first sealed cylindrical bubble sound source; and
  a second cylindrical bubble sound source comprising:
    a second elastic membrane in mechanical communication with a posterior end of the housing at a first end of the second elastic membrane and in mechanical communication with a housing end piece at a second end of the second elastic membrane,
    wherein the second elastic membrane, the housing, the housing end piece, a posterior surface of the diaphragm, and a posterior surface of the subwoofer speaker support together form a second sealed cylindrical bubble sound source.

2. The submersible sound system of claim 1, wherein the first sealed cylindrical bubble sound source further comprises a gas disposed therein and the second sealed cylindrical bubble sound source further comprises a gas disposed therein.

3. The submersible sound system of claim 1, wherein the end cap comprises an elastic portion.

4. The submersible sound system of claim 1, further comprising:
  a control system comprising:
    a processor;
    a memory unit in data communication with processor;
    a controllable power source in electrical communication with the voice coil; and
    an interface configured to receive sensor input data from the subwoofer speaker system;
  wherein the memory unit stores instructions that, when executed by the processor, cause the processor to:
    receive the sensor input data from the subwoofer speaker system; and
    control the power source based on the received sensor input data.

5. The submersible sound system of claim 4, wherein the subwoofer speaker system comprises a first temperature sensor of a first temperature of fluid surrounding the magnet assembly and a second temperature sensor of a second temperature of the voice coil.

6. The submersible sound system of claim 5, wherein the second temperature sensor is an IR temperature sensor.

7. The submersible sound system of claim 5, wherein the sensor input data are received from one or more of the first temperature sensor and the second temperature sensor.

8. The submersible sound system of claim 4, further comprising:

a sensor of an output current of the power source; and
a sensor of an output voltage of the power source,
wherein the memory unit stores instructions that, when executed by the processor, further cause the processor to:
receive current data from the sensor of the output current;
receive voltage data from the sensor of the output voltage; and
control the power source based on the received current data and the received voltage data.

9. The submersible sound system of claim 1, wherein the housing end piece comprises an elastic portion.

10. The submersible sound system of claim 1, wherein an acoustic resonance of the first cylindrical bubble sound source differs from an acoustic resonance of the second cylindrical bubble sound source.

11. The submersible sound system of claim 1, wherein an acoustic resonance of the second cylindrical bubble sound source is dependent on a length of the housing.

12. The submersible sound system of claim 1, wherein, on activation of the voice coil, the diaphragm is configured to move alternatingly between a forward and rearward position, thereby exciting the first cylindrical bubble sound source and the second cylindrical bubble sound source simultaneously but in opposing directions.

* * * * *